United States Patent [19]
Faulkner

[11] 4,344,347
[45] Aug. 17, 1982

[54] DIGITAL ENVELOPE GENERATOR

[76] Inventor: Alfred H. Faulkner, 1324 Portesuello Ave., Santa Barbara, Calif. 93105

[21] Appl. No.: 134,248
[22] Filed: Mar. 26, 1980
[51] Int. Cl.³ .......................... G10H 1/02; G06F 1/02
[52] U.S. Cl. ..................................... 84/1.26; 84/1.13; 364/722
[58] Field of Search ................. 84/1.26, 1.13; 364/722

[56] References Cited

U.S. PATENT DOCUMENTS

| | | | |
|---|---|---|---|
| 3,948,139 | 4/1976 | Melcher et al. | 84/1.11 |
| 4,067,253 | 1/1978 | Wheelwright et al. | 84/1.13 |
| 4,079,650 | 3/1978 | Deutsch et al. | 84/1.26 |
| 4,083,286 | 4/1978 | Faulkner | 84/1.26 |
| 4,099,439 | 7/1978 | Luce | 84/1.26 |
| 4,145,946 | 3/1979 | Deutsch | 84/1.26 |
| 4,178,826 | 12/1979 | Hiyoshi et al. | 84/1.26 |
| 4,185,531 | 1/1980 | Oberheim et al. | 84/1.24 |
| 4,185,532 | 1/1980 | Hiyoshi et al. | 84/1.26 |
| 4,201,109 | 5/1980 | Kitagawa | 84/1.26 |
| 4,226,155 | 10/1980 | Ferdinand | 84/1.03 |

*Primary Examiner*—J. V. Truhe
*Assistant Examiner*—Forester W. Isen

[57] ABSTRACT

A digital envelope generator implemented in the form of an off-the-shelve microcomputer is disclosed. Five envelopes are produced simultaneously in multiplexed form and are output via a digital-to-analog converter and multiplexer to corresponding voltage controlled amplifiers/filters. The outputs are scaled in amplitude in accordance with touch response signals derived from a keyboard and the envelope time constants are scaled in accordance with the pitch of the notes selected by the keyboard. The outputs are available without further modification for controlling the Q of the filters, or the gain of amplifiers, and are simultaneously available with the amplitude scaled in accordance with the pitch of selected notes for controlling the frequency response of the voltage controlled filters.

13 Claims, 13 Drawing Figures

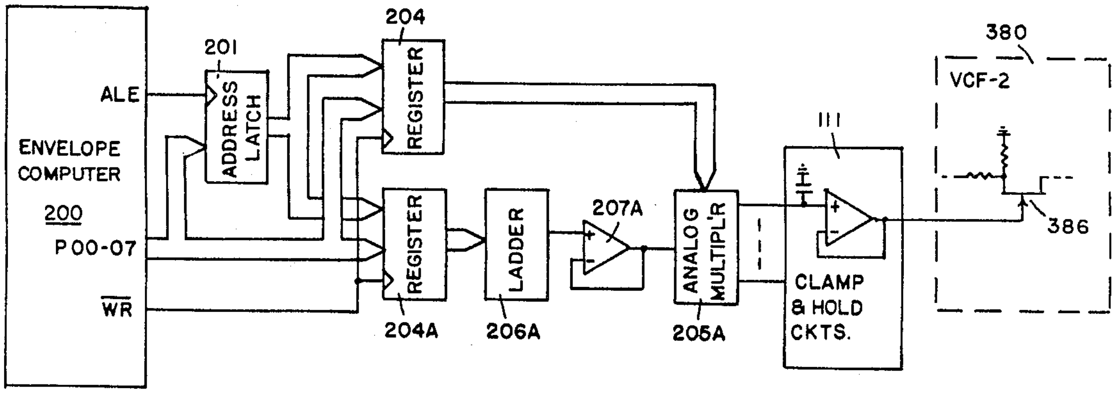
FIG. 5
FIG. 6
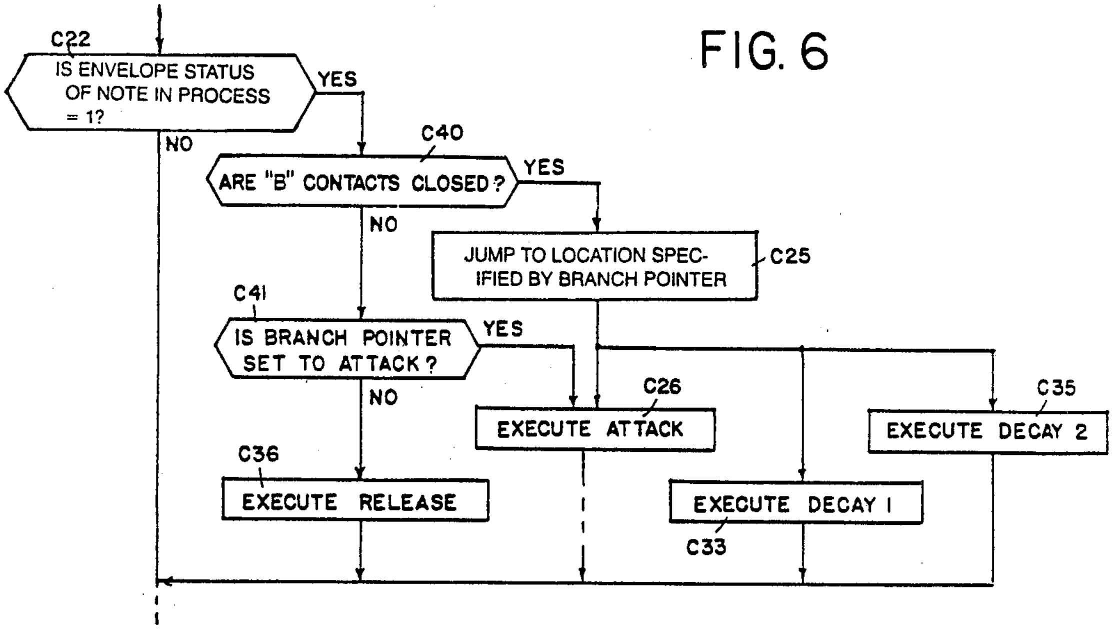

DIGITAL ENVELOPE GENERATOR

BACKGROUND OF THE INVENTION

This invention relates to a digital envelope generator for a polyphonic music synthesizer of the voltage controlled type.

Exponentially decaying waveforms, which are employed to simulate plucked or struck strings; or to simulate percussive effects; are commonly produced by analog circuits using resistive-capacitive circuits. The number of components required was fairly reasonable for the monophonic type synthesizers produced in the past, but has become burdensome in the more recent polyphonic synthesizers. The use of digital techniques to reduce the need for numerous discrete components form the basis for the present invention.

One prior proposal using digital techniques is disclosed in U.S. Pat. No. 3,819,844 by Sigeki Isii. In this patent different valued resistors are sequentially switched into the shunt leg of a voltage divider connected in the tone signal path of each note to be keyed. A second voltage divider is connected in cascade with the first and is controlled by a timer to scale the signal envelope in accordance with the velocity of the playing key during its depression. One serious disadvantage of this arrangement is that an individual switch and resistor must be provided for each attenuation level desired, thereby limiting the range unless very large steps are used. Another difficulty is the necessity of providing a dedicated keyer for every note of the keyboard.

Another digital approach is that disclosed in U.S. Pat. No. 3,515,792 by Ralph Deutsch. This digital organ patent discloses an envelope generator which functions by shifting the digital words representing the tone signal samples to the right by a programmed number of positions, thereby attenuating the signal by 6 db for each shift operation. These steps are too large for use with musical tones having substantial decay times, such as piano tones.

Ralph Deutsch has proposed another type of envelope generator in U.S. Pat. No. 3,952,623, wherein a read-only memory storing a set of attack/decay scale factors in digital form is accessed at successive locations to obtain progressively increasing/decreasing scale factors which are used to scale the amplitude of the tone waveshapes by means of a digital multiplier. This approach requires a memory location for each step of the envelope, which is an inefficient use of memory when many steps are required.

Implementing any of these prior approaches in LSI (large scale integration) form requires the use of custom designs, hence involves a large development expense. Furthermore, both of the Deutsch patents disclose digital organs wherein the envelope is a series of digital words that are multiplied by the digital representations of a tone waveform, summed with similar products for other notes, and finally output through a D/A converter to an audio system. The numerous multiply operations involved in this approach requires the use of a much more sophisticated and higher speed computer than that required by the present invention.

SUMMARY OF THE INVENTION

The embodiments chosen to illustrate the invention are polyphonic synthesizers employing a digital type keyboard where the playing keys are scanned repetitively to detect changes in key states and idle note generators are assigned to playing keys in response to their depression. In conventional polyphonic synthesizers an analog envelope generator associated with each note generator is triggered by the operation of the playing key to which it is assigned to control the gain of a voltage controlled amplifier connected to the output of the associated note generator. In the disclosure the conventional analog envelope generators are replaced by digital envelope generators which are implemented in a standard form of microcomputer, or microcontroller, in a multiplexed fashion.

The microcomputer organization implemented by the programs disclosed herein provides for varying the nominal envelope time constants under control of a set of common counters, whose range is in turn controlled by manual preset controls; and for independently varying the envelope time constants under control of a counter individual to each envelope generator, whose range is in turn controlled in accordance with pitch and touch response signals derived from the keyboard. This organization also provides independent control of the envelope amplitudes in accordance with the touch response data.

A principal object of the present invention is to provide a digital envelope generator that can be implemented in LSI form with little or no development expense through the use of programmatic approach using an off-the-shelf microcomputer.

Another object of the invention is to provide a digital envelope generator having provisions for scaling the amplitude of a nominal envelope waveshape in accordance with a touch response signal derived from a keyboard.

A further object of the invention is to provide a digital envelope generator having provisions for scaling the time constants of the nominal envelope waveshape in accordance with the pitch of the selected note to simulate acoustic type instruments.

A still further object of the invention is to provide a digital envelope generator having provisions for scaling the amplitude of the nominal envelope waveshape in accordance with the pitch of the selected note so as to normalize the frequency characteristics of voltage controlled filters used between a tone generation system and an audio output system for timbre alteration.

Still another object of the invention is to provide an envelope generator implemented in a first microcomputer and adapted to interface with a second microcomuter that services the keyboard and voice controls.

Another object of the invention is to provide a digital envelope generator that can be implemented in a single microcomputer that also services the keyboard and voice controls.

Yet another object of the invention is to provide a digital envelope generator having provisions for simultaneously generating a nominal envelope having an amplitude that is independent of the selected pitch and a second envelope obtained by scaling the nominal envelope in accordance with the pitch of the selected note.

Other objects of the invention will be apparent from the following description and the accompanying drawings. While illustrative embodiments of the invention are shown in the drawings and will be described in detail herein, the invention is susceptible of embodiment in many different forms and it should be undersood that the present disclosure is to be considered as an example of the principles of the invention and is not intended to limit the invention to the embodiments illustrated.

BRIEF DESCRIPTION OF THE DRAWINGS

FIG 5, is a block diagram showing a modification of the system shown in FIGS. 1*a* and 1*b* to provide for simultaneous outputs of envelopes in both nominal amplitude and pitch scaled amplitude forms.

FIG. 6, is a flow chart showing a modification of the envelope computer program depicted in FIG. 3.

DESCRIPTION OF THE PREFERRED EMBODIMENTS

I. Organization of The Music Synthesizer

Figure 1A:
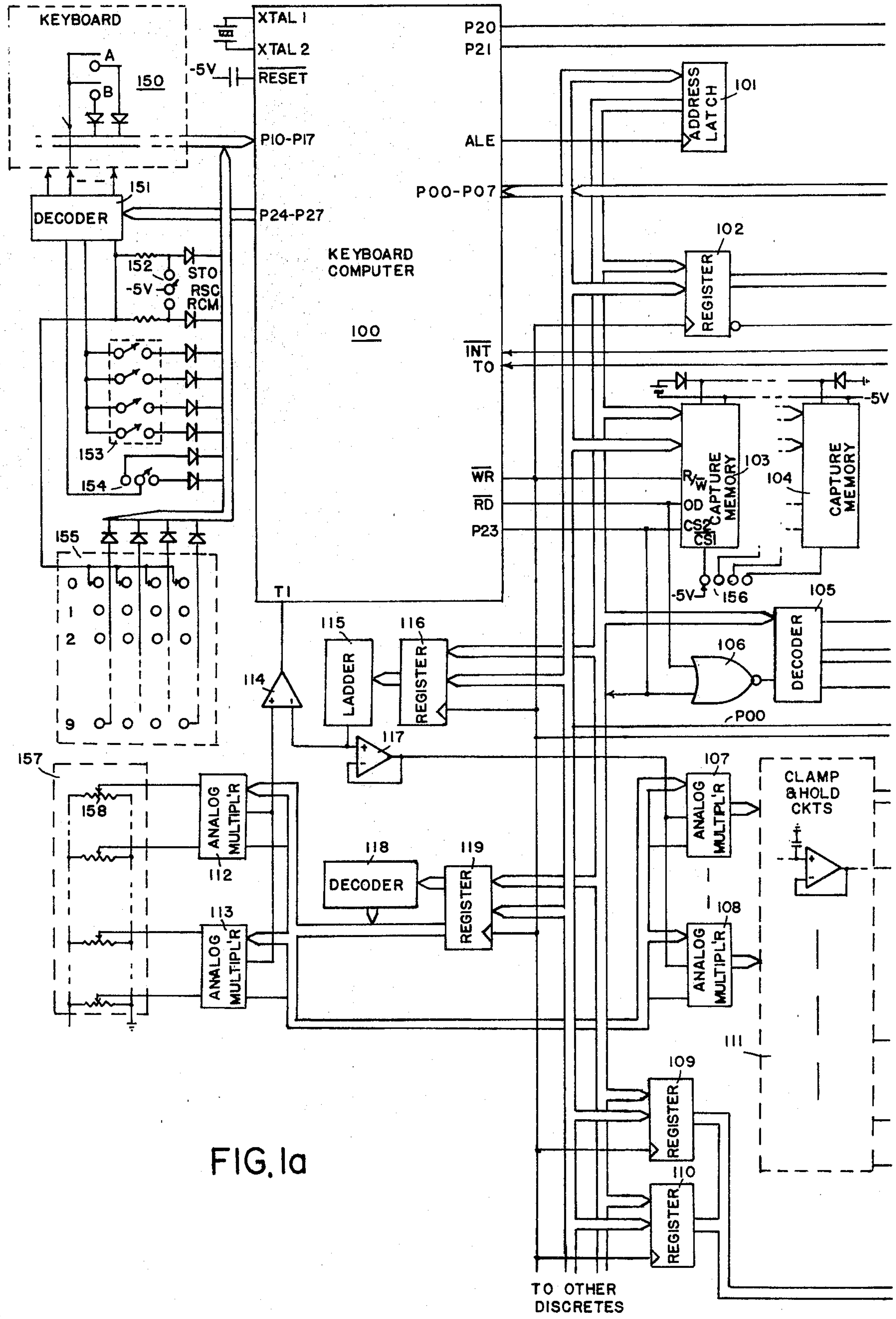
FIGS. 1*a* and 1*b*, when placed side by side, form a unitary functional block diagram of one preferred embodiment of a digital polyphonic music synthesizer using the invention.
Figure 1B:
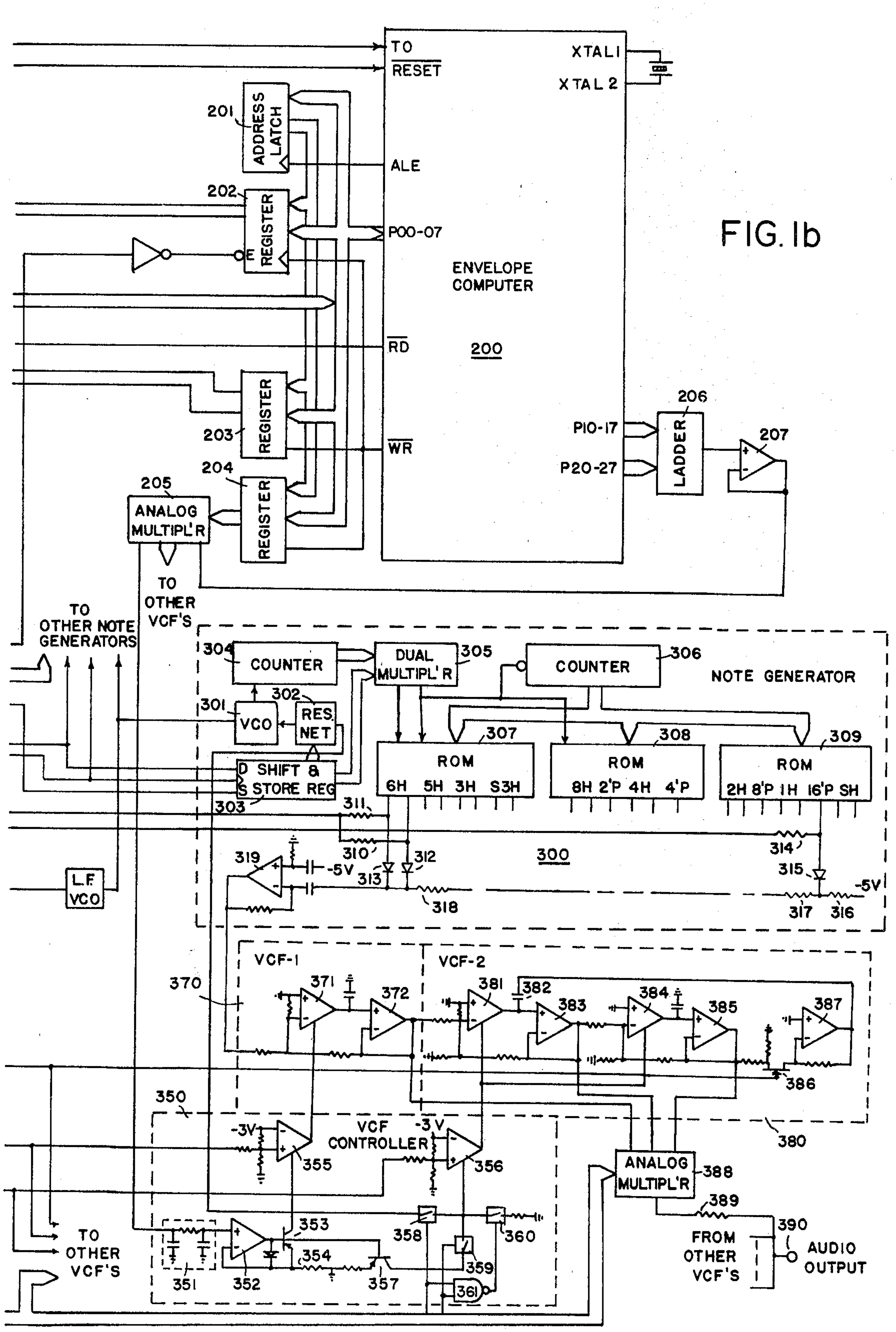

As shown in FIGS. 1*a* and 1*b*, two microcomputers (Intel 8048 or 8748) are provided. The keyboard computer 100 interfaces the keyboard 150; capture memory control switches 155 and 156; voice controls 153, 154, 157; intercom registers 102, 202 and 203, capture memories 103-104; five note generators, such as 300, through decoder 105; clamp-and-hold circuits 111; and discrete registers 109 and 110.

The envelope computer 200 interfaces intercom registers 102, 202 and 203; and five voltages controlled filters (VCFs), such as 350, 370, 380, through a D/A ladder network 206 and analog multiplexer 205.

Since the 8048 and 8748 microcomputers are standard devices that are well known in the art and are fully described in the MCS-48 User's Manual, published by Intel Corp., their architecture and circuit operation are not described herein. The two computers 100 and 200 may each be provided with its own 6 mhz crystal, as shown, or they may be operated in synchronizm from a common source.

The principal function of the keyboard computer is to scan the keyboard contacts about once every millisecond, detect any changes in contact states, measure the travel time of a key being depressed, assign an idle envelope generator to a key when it has been fully operated, and transmit pitch and key velocity (touch response) information to the envelope computer. Pitch information is also transmitted to the appropriate note generator, such as 300.

An auxiliary function, performed at a much slower rate, is to scan the voice, or preset, controls; convert each one to digital form; convert the digital value to a new value, when required, using a look-up table; and then output the original, or new, value to a ladder network 115, thence to a corresponding clamp-and-hold circuit 111 via the analog multiplexers 107-108.

If the player wishes to store the voice, or preset, control set-up in use; the STO mode is entered briefly, by operation of switch 152, causing the digitized values of the voice control settings to be stored in a capture memory 103-104 at a location selected by operation of switches 155 and 156. Conversely, if the player wishes to recall a previously stored voice control set-up; the RCM mode is entered, by operation of switch 152, causing the digitized values of the desired settings to be read from the capture memory; converted by the look-up table, if necessary, and output to the clamp-and-hold circuits.

Some of the voice controls 157 are used to vary the attack/decay parameters of the envelope generators. In an analog system these controls would be connected directly to corresponding inputs of a set of analog type envelope generators. In the present system these inputs are digitized and stored in registers in the keyboard computer 100. Wherever a change occurs in these input values, the new values are stored internally and are also transmitted to the envelope computer 200.

Additional voice controls are provided in the form of switches, such as 153 and 154, which may be individual or combinatorial. In either case they are input as 4-bit nibbles, to conform with the 4-bit words used in the captive memory, and are output to corresponding 4-bit registers, such as 109 and 110.

The envelope computer 200 is dedicated to the generation of five envelopes simultaneously. Updated digital amplitude values are output repetitively in sequence to the 16-bit ladder 206, thence via an analog multiplexer 205 to corresponding voltage controlled filters such as 350, 370, 380.

II. Operation of the Keyboard Computer

The 8048 or 8748 computer provides 1024 words by 8 bits of read-only (ROM) program memory and 64 words by 8 bits of resident data memory (RAM). All data memory locations are indirectly addressable through either of two RAM pointer registers which reside at addresses 0 and 1 of the register array. In addition, the first 8 locations (0–7) of the array are designated as working registers and are directly addressable by several instructions. By executing a register bank switch instruction RAM locations 24-31 are designated as the working registers (R0'-R7') and are then directly addressable. RAM locations 8-23 contain the program counter stack; which is addressed by the stack pointer, during subroutine calls, as well as by pointer registers R0 and R1.

A memory map showing the allocation of the 64 registers (0-3F in hexadecimal notation) is shown in Table I. An "x" in any bit column signifies that either a 0 or a may be stored in that bit position, while a "0" signifies an unused bit that is set to 0 during initialization.

TABLE I

MAP OF KEYBOARD COMPUTER DATA MEMORY

| REG | BITS 76543210 | FUNCTION |
|---|---|---|
| 0 | xxxxxxxx | Indirect addressing-general use |
| 1 | xxxxxxxx | Indirect addressing-keyboard status |
| 2 | 0000xxxx | Identifier-current keyboard group |
| 3 | 000000xx | Identifier-current bit of keyboard group |
| 4 | 0000xxxx | Mask for-current bit of keyboard group |
| 5 | xxxxxxxx | General register use |
| 6 | xxxxxxxx | General register use |
| 7 | xxxxxxxx | Save ACC during interrupts |
| 8-D | xxxxxxxx | 3 level address stack |
| E-15 | 00000000 | Spares |

TABLE I-continued

| MAP OF KEYBOARD COMPUTER DATA MEMORY | | |
|---|---|---|
| | BITS | |
| REG | 76543210 | FUNCTION |
| 16 | 0000000x | F3 flag |
| 17 | xxxxxxxx | Save ACC during certain branch operations |
| 18 | xxxxxxxx | (R0')-General indirect addressing |
| 19 | xxxxxxxx | (R1')-General indirect addressing |
| 1A | xxxxxxxx | (R2')-General register use |
| 1B | 0xxxxxxx | (R3')-Note 1 key assignment |
| 1F | 0xxxxxxx | (R7')-Note 5 key assignment |
| 20 | xxxxxxxx | Note 1-Start time/touch response |
| 24 | xxxxxxxx | Note 5-Start time/touch response |
| 25 | 000xxxxx | Notes 1-5, "A" contact status |
| 26 | 000xxxxx | Notes 1-5, "B" contact status |
| 27 | 000xxxxx | Notes 1-5, Envelope status |
| 28 | xxxxxxxx | "A"&"B" contact status, keys $F_3$–$G_3$# |
| 29 | xxxxxxxx | "A"&"B" contact status, keys $A_3$–$C_4$ |
| 2A | xxxxxxxx | "A"&"B" contact status, keys $C_4$#–$E_4$ |
| 2B | xxxxxxxx | "A"&"B" contact status, keys $F_4$–$G_4$# |
| 2C | xxxxxxxx | "A"&"B" contact status, keys $A_4$–$C_5$ |
| 2D | xxxxxxxx | "A"&"B" contact status, keys $C_5$#–$E_5$ |
| 2E | xxxxxxxx | "A"&"B" contact status, keys $F_5$–$G_5$# |
| 2F | xxxxxxxx | "A"&"B" contact status, keys $A_5$–$C_6$ |
| 30 | xxxxxxxx | "A"&"B" contact status, keys $C_6$#–$E_6$ |
| 31 | xxxxxxxx | "A"&"B" contact status, keys $F_6$–$G_6$# |
| 32 | xxxxxxxx | "A"&"B" contact status, keys $A_6$–$C_7$ |
| 33 | xxxxxxxx | Time |
| 34 | xxxxxxxx | Reserved for interrupts |
| 35 | xxxxxxxx | Reserved for interrupts |
| 36 | xxxxxxxx | Reserved for interrupts |
| 37 | xxxxxxxx | Block starting address - Capture memory |
| 38 | 000xxxxx | Current parameter number |
| 39 | 00000000 | Spare |
| 3A | xxxx0000 | B—Breakpoint |
| 3B | xxxx0000 | A—Attack |
| 3C | xxxx0000 | D1—Decay 1 |
| 3D | xxxx0000 | D2—Decay 2 |
| 3E | xxxx0000 | R—Release |
| 3F | xxxx---- | Block select-capture memory |
| | ----00xx | STO & RSC - Mode control signals |

Figure 2A:
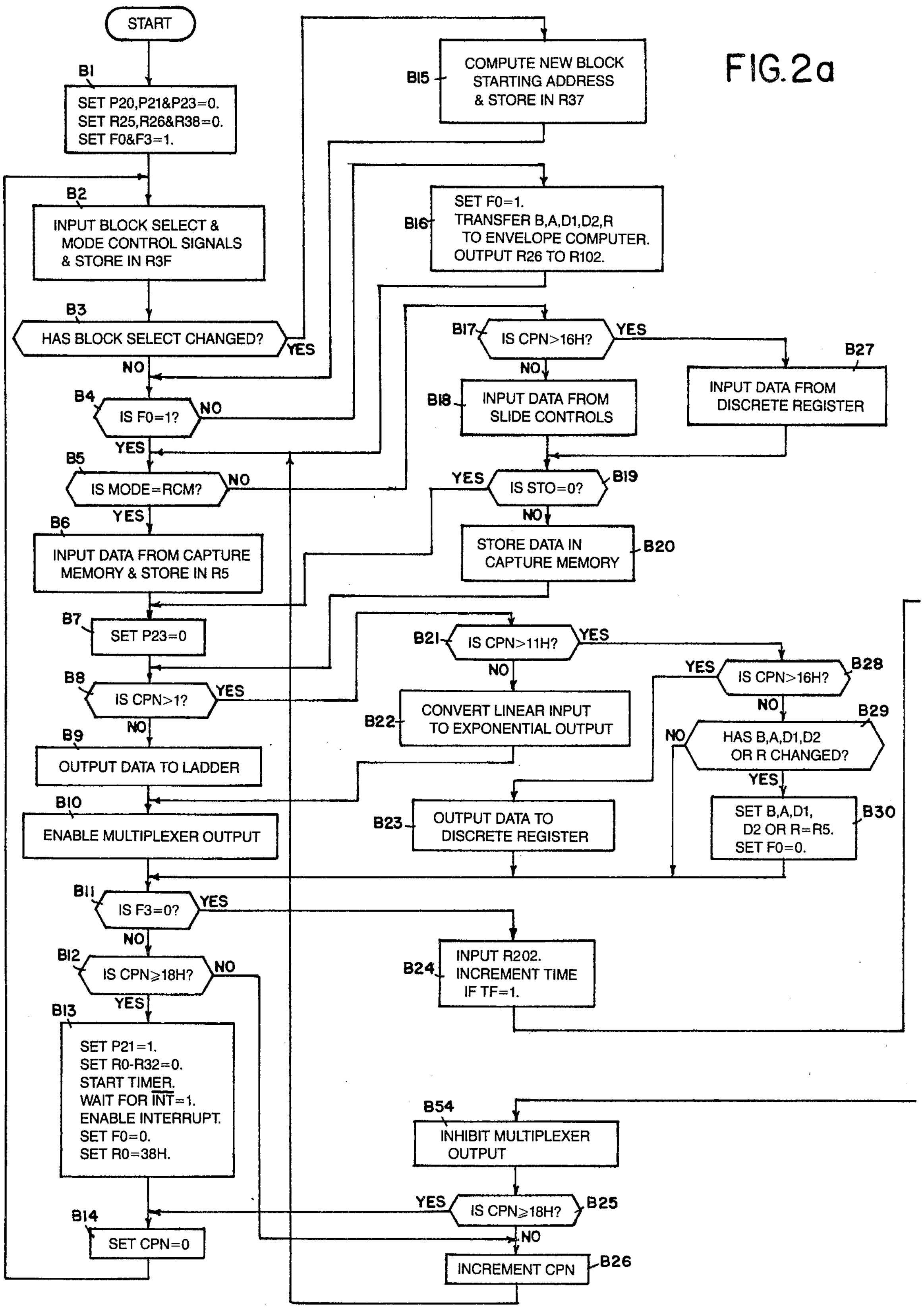
FIGS. 2*a* and 2*b*, when placed side by side, form a unitary flow chart of the program used in one microcomputer, shown in FIG. 1*a*, that services the keyboard and voice controls.

When power is applied to the computer 100 an internal reset pulse is generated to clear critical working registers, such as the program counter. After the capacitor connected to the $\overline{\text{RESET}}$ input has charged to the threshold of an internal Schmitt trigger, the reset pulse is terminated and operation under program control commences at location 0 in the program memory. The program memory listing is shown in Table IX, which appears at the end of the specification, but for simplicity the operation will be described with reference to the flow chart shown in FIG. 2. A modified program listing is shown in Table XI. Operation with the modified program is described separately in Section IV.

In block B1: port 21 (port 2, bit 1) is set to zero to reset the envelope computer and hold it disabled until the keyboard computer has initialized the clamp-and-hold circuits 111 (FIG. 1). Flag F0, which is set to 1 in block B1, will be set to 0 when the initialization of these circuits is completed, as described hereinafter. F3 designates a flag, but is actually bit 0 of R16. It is set to 1 in block B1 and is reset to 0 in B13 after initialization operations are completed.

In block B2: the states of mode select switch 152 and the block selection switches 155 are stored in register 3F. If the block selection has changed since the last program cycle the program branches through block B15 to compute a new block starting address, which is the actual address in the capture memory at which the selected group of voice control set-up values starts. The desired capture memory chip, such as 103 or 104, is selected independently by means of switch 156. Since F0=1, the program omits B16 for the present and proceeds to B6 or B17, depending on the mode selected. Assume that RSC (read slide controls) has been selected for now, in which case RCM (read capture memory) is false. Since the current parameter number (CPN) stored in R38 is set=0, the program branches from B5 via B17 to B18.

In block B18: register 119 is set to zero by the program. The three LSBs (least significant bits) of 119 are connected in parallel to all of the input/output analog multiplexers, such as 112 and 107. The effective higher order bits of 119 are decoded by 118 to select a corresponding one of these multiplexers. Assuming that slide control 158 is selected, its setting is applied to the input of comparator 114. The program now implements a successive approximation D/A conversion routine, using register 116 and ladder 115 to generate the trial values, to convert the slide control setting to a 4 bit digital value which is generated in the MSN (most significant nibble) of R5. Since STO=0, the program skips B20 and goes via B7 to B8.

In block B8: CPN (R38) is tested and, since it is initially 0, the program enters block B9 where the data in R5 is output to register 116. The first two voice control parameters are the vibrato rate and vibrato depth. These parameters vary linearly with slide control position, hence are output without modification.

In block B10: one of the high order bits of register 119 is set to 1 to enable the output analog multiplexer, such as 107, which connects to the clamp-and-hold circuit 111 for the parameter in process. Since F3 is set to 1, the program proceeds to block B12.

In block B12: since CPN is initially 0, the program branches to B26 where CPN is incremennted by 1. The program then returns to B5 and repeats the above described minor loop with the following variations.

As mentioned previously, the first two voice control parameters are linear functions of the slide control position, hence are output to the clamp-and-hold circuits without modification other than the quantization resulting from the A/D conversion. In other words, the input/output transfer function is linear in this case. The next 16 parameters are the desired amplitudes of four pulse waveforms (16'P, 8'P, 4'P, and 2'P); nine harmonic components (SH, 1H, S3, 2H, 3H, 4H, 5H, 6H and 8H); two filter frequency controls (FC1 and FC2); and a filter Q, or resonance, control (FQ). These output amplitudes should vary approximately exponentially with the slide control position. Although slide controls having so called logarithmic, or audio, tapers could be employed; there use would require digitizing to eight bits, rather than four, hence would double the size of the capture memory. Furthermore, the taper and uniformity obtainable in such controls leave much to be desired. These difficulties are overcome in the present embodiment of the invention by using slide controls of the linear variety and converting the linear input to an exponential output, or other desired output shape, by the use of a look-up table included in the program memory section of the keyboard computer. In this case the input/output transfer function is changed to an exponential form by the look-up table. This programmed shaping system also allows use of commercially available 4-bit binary coded switches in lieu of the analog controls if desired.

Whenever CPN is between 2 and 11H (17 in decimal notation), the program branches B8 via B21 to B22.

In block 22, the 4 bit data in R5 is used to address a linear to exponential conversion table stored in every 4th location of the program memory commencing with 303 and ending with 33F. Every 4th location is used to fill voids in the key assignment-to-pitch conversion table which starts with location 300 and ends with 33E. The converted data (8 bits) is output to register 116 and the program then returns to the original minor loop at B10. On the nineteenth pass through the minor loop CPN=12H, hence the program branches from B21 via B28 to B29.

In block B29: the new data in R5 is compared with the corresponding prior data (which is practically random data following initialization) stored in R3A-R3F. If the data is unchanged the program returns to the original minor loop at B11, otherwise it proceeds to B30. In block B30: the old data in R3A-R3F is replaced with the new data in R5 and flag F0 if set=0 before the program goes to B11.

The parameters B, A, D1, D2 and R stored in R3A-R3E require some explanation since they differ from the customary ADSR parameters provided by conventional synthesizers. The A, D1 and R parameters of the present envelope generator correspond to the conventional A, D and R parameters. In lieu of a sustain mode, the present synthesizer provides a breakpoint (B) control that establishes the level at which the initial decay (D1) is terminated and is replaced by a second decay (D2). If the second decay is set to infinity, then the breakpoint control becomes the equivalent of the conventional sustain (S) control. The provision of two decay rates permits a much more realistic piano sound to be achieved.

After the B, A, D1, D2 and R parameters have been processed, CPN=16H. On the following pass the program branches from B17 to B27.

In block B27: the computer 100 outputs a code on port 2-MSN (most significant nibble=bits 4–7) corresponding to the set of four discrete switches 153 and inputs data corresponding to the switch settings via port 1-MSN. This data is held temporarily in R5, just as all the other control parameters are. When B28 is reached the program branches to B23.

In block B23: the data in R5 is output as a 4 bit nibble to the first discrete register 109. On the next pass the status of switch 154 is transferred to the second discrete register 110 in like manner. Only two discrete registers are needed in the synthesizer described; but it should be apparent that additional switches, such as 153 and 154; and registers, such as 109 and 110, can readily be provided for simply by changing the constants in the instructions that control program branching as a function of CPN.

On the 25th pass through the minor loop CPN=18H, which causes the program to exit at B12 to B13.

In block B13: port 21 is set=1 to enable the envelope computer 200, registers R0-R32 are cleared to 0, and the built-in timer is started. Computer 100 then enters a wait loop if its $\overline{\text{INT}}$ input is low. After computer 200 sets INT high; computer 100 enables its interrupt, sets F0=0, and sets R0=38H. The built-in timer runs continuously and sets a timer flag, TF, when it overflows. This flag is tested in block B24, causing R33 (Time) to be incremented if it is true. The flag is reset automatically when it is tested.

The block B14: CPN (R38H) is set=0. The program now returns to B2 to start its major loop. F0 is invariably set=0 during the initial minor loop operations, hence the program branches from B4 to B16.

In block B16: the flag F0 is set=1 and a software interrupt of the envelope computer is initiated by setting port 20=1. During the execution of this interrupt the breakpoint parameter stored in R3A is complemented before being transmitted to the envelope computer via register 102. The attack parameter A (R3B) is converted to an 8 bit byte, using a table stored in locations 3DO-3DF of the program memory, before being transmitted. Similarly, the D1, D2 and R parameters are converted to 8 bit bytes using a different table stored in locations 3EO-3EF. These conversions, which are shown in Table II below, are performed for the benefit of the envelope computer; but are located in the keyboard computer to conserve memory space in the other computer. The purpose of the conversions will be explained in the description of the envelope computer operation. At the end of the interrupt sequence the data in R26, which is 0 at this point, is output to register 102. The envelope computer inputs this register repetitively to ascertain the status of the playing keys to which its five envelopes are assigned, if any. The program then returns to the major loop at B5 and proceeds as described previously until B11 is reached. Since F3 is now 0, and will remain so until the power is turned off, the program now always branches to B24.

TABLE II

| ATTACK-DECAY PARAMETER | ATTACK COUNTER DATA | DECAY COUNTER DATA |
|---|---|---|
| 0 | 00H | 21H |
| 1 | 00 | 21 |
| 2 | 01 | 42 |
| 3 | 01 | 42 |
| 4 | 02 | 42 |
| 5 | 02 | 64 |
| 6 | 03 | 64 |
| 7 | 03 | 64 |
| 8 | 04 | 88 |
| 9 | 04 | 88 |
| A | 05 | 88 |
| B | 48 | B0 |
| C | 6A | B0 |
| D | 8E | C0 |
| E | B6 | C0 |
| F | C6 | 00 |

In block B24: the envelope status is input from R202 and is stored in R27. The envelope computer repetitively outputs the status of its five envelopes to register 202, setting the corresponding bit to a "1" when an envelope is initiated and restoring it to "0" when the envelope has decayed to zero. As described above, the timer flag is tested and Time (R33) is incremented if it is true.

In block B31: R1 is set=28H, which is the first location in the group R28-R32 where the keyboard contact status is stored. R2 is set=1 to identify the current key group as F3-G3#. The 44 note keyboard contains 11 groups, as shown in Table I. There are two contacts per key; the "A" contacts (FIG. 1*a*) close near the beginning of a keystroke and the "B" contacts close near the end. Hence it takes two bits to define the status of each key. Thus a group of four keys requires eight bits of data, or a pair of nibbles, to define its status.

In block 32: R3 is set=0 to identify the current bit pair (bits representing the "A" and "B" contacts of a playing key). Since the keyboard status is manipulated as data bytes in which the LSN represents the "A"

contacts and the MSN represents the "B" contacts, the value 0 in R3 identifies the current bit pair of bits 0 and 4. For masking purposes, the current bit pair is also identified as a 1 in the corresponding bit position 0-3 of R4; hence R4 is set=1. The current nibble pair is input from the keyboard by setting port 2MSN=R2 and then inputing port 1. The decoder 151 translates the four bits from port 2 into a 1 of 16 selection eleven of which correspond to the commoned contacts of four adjacent keys. The individual contacts of all of the keys are connected through isolating diodes to corresponding terminals of port 1. The input data is stored @R1, i.e. at the location pointed to by R1, and the exclusive-or function of the previously stored data with the newly stored data is placed in the accumulator ACC (not shown).

In block 33: if there has been no change in any of the eight contacts associated with the first group of four keys, the ACC=0 and the program proceeds to B34.

In block B34: R1 and R2 are both incremented to point to the next key status storage location and the next group of keys respectively.

In block B35: R1 is tested to determine whether the entire keyboard has been scanned. If not, the program returns to B32 to input the status of the next group of keys. If so, the program continues the major loop at B54, processes the control parameter identified by CPN, and returns to the keyboard branch at B31.

Assume now that playing key $C_5$ is depressed. The keyboard scanning operation proceeds as previously described until R1=2CH and block B33 is reached. At this point R2C=00001000 and ACC=00001000, hence the program branches to B36.

In block B36: bit 0 of ACC is tested to see if the "A" contacts of note $A_4$ have changed state, and In block B37: bit 4 of ACC is tested to see if the "B" contacts of note $A_4$ have changed state. Since neither contact of note $A_4$ has changed the program proceeds to B42.

In block B42: ACC is rotated right one bit, hence ACC now=00000100. R3 is incremented and R4 is left shifted to identify the bit pair in process as bits 1 and 5 of the original input data.

In block B43: R3 is tested to see if processing of the pair of nibbles has been completed. If so, the program returns to the keyboard input loop at B34; otherwise it loops back to B36.

In block B36: on the fourth pass ACC=00000001, hence the program branches to B44.

In block B44: the contents of ACC are saved in R17.

In block B45: ACC is set=R2C and is masked with R4 to test the "A" contact status of the playing key in process. If the test indicates these contacts are closed the program branches to B48.

In block B48: bits 0 and 1 of R3 are moved to bits 4 and 5 of ACC, then R2 is added to ACC to obtain a bit and group key identifier which is then compared with the key assignments stored in R1B-R1F in sequence. If a match is found a mask identifying the corresponding note generator is placed in R6. Thus when a playing key is operated repetitively the same note generator is selected each time.

In case no match is found; R26 and R27 are examined in search of an idle note generator; defined as one that has been released by the playing key to which it is assigned and whose envelope amplitude has delayed to 0 (or other predetermined minimum value). Hence an idle note generator has 0's in its corresponding bit position in both R26 and R27. If one or more idle note generators exist, the first one encountered is selected by placing a corresponding mask in R6.

In case no idle note generator is found, a search is made for a vulnerable note generator; defined as one that has been released by the playing key to which it is assigned and whose envelope amplitude has not decayed fully. R26 and R27 are again examined, this time for a 0 in R26 and a 1 in the same bit position in R27, and a mask of the vulnerable note generator is stored in R19 if one is found. If there is only one such note generator, the key in process is assigned to it; but if there is more than one, a software interrupt of the envelope computer is initiated by setting port 20=1. The envelope computer then identifies the vulnerable note generator having the lowest envelope amplitude and the keyboard computer assigns that note generator to the key in process.

In the event that there is no note generator available, as when the player depresses more that five keys, the program branches to B51.

In block B51: the "A" contact status of the key in process is set=0@R1 so that the attempt to fine an available note generator for this note will be repeated on subsequent scans of the keyboard. If a note generator is available, the program proceeds to B50.

In block 50: the "A" contact status in R25 corresponding to the assigned note generator is set=1. The present time from R33 is stored in the register of group R20-R24 that corresponds to the assigned note generator. The key identifier is stored in the register of group R1B-R1F that corresponds to the assigned note generator. ACC is then restored from R17 and the program returns to the previous loop at B37. Ordinarily, a change in state of the "B" contacts will not be detected in the same pass as the "A" contacts, but it is possible. In any event, the change in state of the "B" contacts will be detected in block B37, sooner or later, and the program will then branch to B38.

In block B38: the ACC is saved in R17.

In block B39: ACC is set=R2C, the MSN and LSN are interchanged and the result is masked with R4 to test the "B" contact status of the playing key in process (assumed to be $C_5$ in the present instance). If the test shows the contacts are open, the program branches to B47, restores A from R17, and returns at B42. If the contacts are closed, the program proceeds to B40.

In block B40: R2 and R3 are combined to form the note identifier which is then compared with R1B-R1F successively to find the note generator assigned to the key in process. The time stored in the corresponding register in the group R20-R25 is then subtracted from the present time, from R33, to obtain the elapsed time between closure of the "A" and "B" contacts of key $C_5$. The number of leading zeros in the elapsed time are counted and multiplied by two. The result is increased by one if the first bit following the leading 1 is a 0. The result is complemented and stored in the register of group R20-R24 associated with the assigned note generator. This value is the touch response date (TRSP) and it replaces the start time, which is no longer needed. The object of the algorithm described above is to produce a touch response value that varies in an exponential relation to the travel time of the playing key. The "B" contact status of the assigned note generator is set=1 in R26 and is also output to register 102 to notify the envelope computer of the action. ACC is restored from R17 in B41 and the program continues, as previously described, at B42.

In response to the 1 output to register 102, described above, the envelope computer in due time sets the $\overline{INT}$ input of computer 100 low via register 203. The normal operation of the keyboard computer ceases upon completion of the instruction in process and the program counter is pointed to location 3, where the interrupt subroutine INT, shown in FIG. 2*d,* starts.

In block B53: the keyboard computer acknowledges the interrupt by setting port 20=1, saves ACC and three general registers as indicated, inputs an interrupt instruction from computer 200 via register 202, sets a 1 in R27 in the bit position corresponding to the note generator being serviced, transmits pitch and touch response data from the corresponding pair of registers in the group R1B-R24, and transmit pitch data as a serial data stream on port 00 to all shift and store registers, such as 303. Following the serial data stream, the strobe input of the shift and store register in the note generator being serviced is selectively pulsed via the $\overline{RD}$ output of computer 100, gate 106 and decoder 105. The serial data transmission allows use of the shift and store register 303 (RCA Type 4094) which saves components since it stores eight bits in one standard 16 pin package. Register 303 controls the pitch of the voltage controlled oscillator (VCO) 301 and selects the appropriate output from counter 304 via multiplexer 305 to drive counter 306 in accordance with the octave containing the note to be played. Finally, the registers saved at the start of the interrupt are restored and the program resumes at the point where it was interrupted. In the following, the operation of the keyboard computer in response to release of a playing key, $C_5$ in the present example, is described.

As long as there is no change in state of the keyboard contacts the program loops through B32-B35 eleven times, with no branches to B36, then traverses the branches of FIG. 1*a* to process one control parameter being resuming the keyboard scan. This interleaving of the control parameter processing with keyboard scans provides more frequent scanning of the keyboard and still provides adequate processing speed for the control parameters.

As the $C_5$ playing key is released, the "B" contacts open first. This causes the program to branch from B33 through B36, B37, B38, B39, B47, B42 and B43 without effect. When the "A" contacts open, the program branches from B36 to B44 and from B45 to B46.

In block B46: the note generator assigned to $C_5$ is located as described previously for blocks B40 and B48. The corresponding bits in R25, R26 and register 102 are set=0. A wait loop is then entered until the envelope computer inputs the changed state of register 102. The program then returns to its normal loop via B47 and B42.

The operation of the capture system will now be described. In the illustrated embodiment there are 25 voice control parameters. They are vibrato rate and depth, pulse type tones at four pitches, nine harmonic components, five attack/decay parameters, two voltage controlled filter (VCF) frequency parameters, one VCF resonance (or Q) control, one switch set to select the VCF roll-off rate, and one switch to select the operating mode of the second VCF. When the player has found a set of these 25 parameters that he wishes to capture for future recall, he merely selects a two digit block location, using switches 155 and 156, and operates switch 152 to the STO position momentarily. Switch 156 selects one of any desired number of capture memories, each of which has 256×4 storage cells. These may be type 5101 (CMOS) memories which will retain data for one to two years when powered by a two cell hearing aid type battery. When the synthesizer is being played the capture memories are supplied with 5 volts through one diode and the two primary cells are isolated by a second diode. Each memory chip can store ten set-ups; or data blocks, of 25 parameters. As explained previously, the program converts the block select input from switch 155 into a block starting address in B15. When the STO mode is selected, the program proceeds from B19 to B20.

In block B20: port 23 is set=1 to select the capture memory and the digital value of the current parameter, held temporarily in R5, is stored in the corresponding location of the selected block in the selected memory chip, such as 103. During each pass through the major loop a different one of the 25 control parameters is stored in the selected block in like fashion. In a few tens of milliseconds, the entire block is stored.

Now suppose the player wishes to recall a set-up previously stored in the capture memory. In this case the mode switch 152 is operated to the RCM position. The program consequently proceeds from B5 to B6.

In block B6: port 23 is set=1 to select the capture memory and inhibit the decoder 105. The digital value of the current parameter is read from the selected block of the selected chip and is held temporarily in R5. During each pass through the major loop a different one of the 25 control parameters is read from the capture memory, converted to an eight bit byte when an exponential output is required; and is cyclically transferred to the corresponding clamp-and-hold circuit 111, or to the data memory at R3A-R3E. This cyclical operation continues as long as the selected set-up is in use, thus avoiding the need for any additional storage internal to computer 100 to provide the recall function.

Figures 2B, 2C, 2D:
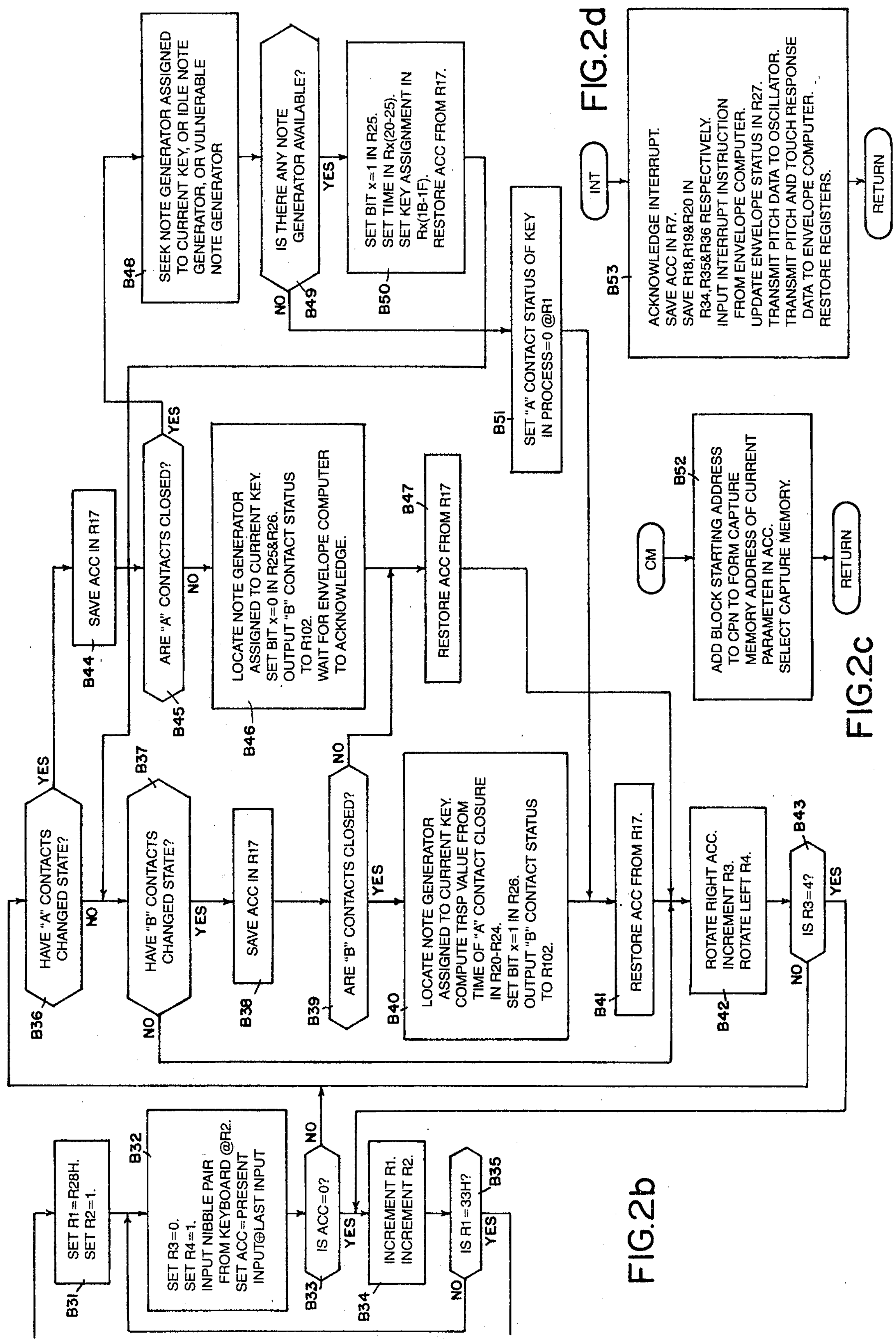
FIGS. 2*c* and 2*d*, are flow charts of subroutines used in the above keyboard microcomputer.

Each time that the capture memory is accessed in B6 and B20, CPN must be added to the block starting address, R37, to obtain the capture memory address; and the indirect addressing register R1 must be pointed at the capture memory. To conserve instructions, the subroutine CM shown in FIG. 2*c* is employed to perform these operations.

III. Operation of the Envelope Computer

A memory map showing the allocation of the 3FH (64 in decimal notation) registers in the envelope computer is shown in Table III. Registers R0-R17 are common to all five of the envelope generators (EG1-EG5) implemented by this computer. Registers R18-1F are dedicated to EG1, R20-R27 are dedicated to EG2,—and R38-R3F are dedicated to EG5.

TABLE III

MAP OF ENVELOPE COMPUTER DATA MEMORY

| REGISTERS | BITS 76543210 | FUNCTION |
|---|---|---|
| 0 | xxxxxxxx | Indirect addressing of R18-R3F |
| 1 | xxxxxxxx | Indirect addressing of RF-R17 |
| 2,3,4,5,6 | xxxxxxxx | General register use |
| 7 | xxxx---- | Attack exponent |
| | ----xxxx | A,D1,D2,R counter flags |
| 8,9,A,B | xxxxxxxx | 2 level address stack |
| C,D,E | 00000000 | Spares |
| F | 000xxxx | Present status of "B" contacts of keys assigned to EG1-EG5 |
| 10 | 000xxxxx | Last status of "B" contacts of keys assigned to EG1-EG5 |
| 11 | 000xxxxx | Envelope status of "B" contacts |

TABLE III-continued

| MAP OF ENVELOPE COMPUTER DATA MEMORY | | |
|---|---|---|
| | BITS | |
| REGISTERS | 76543210 | FUNCTION |
| | | of keys assigned to EG1-EG5 |
| 12 | xxxxxxxx | Time |
| 13 | xxxx0000 | BC—Break level complement |
| 14 | xxx----- | A—Attack parameter |
| | ---xxxxx | AC—Attack counter |
| 15 | xxx----- | D1—Decay 1 parameter |
| | ---xxxxx | D1C—Decay 1 counter |
| 16 | xxx----- | D2—Decay 2 parameter |
| | ---xxxxx | D2C—Decay 2 counter |
| 17 | xxx----- | R—Release parameter |
| | ---xxxxx | RC—Release counter |
| 18,20,28,30,38 | xxxx---- | Pitch |
| | ----xxxx | TRSP (touch response) |
| 19,21,29,31,39 | xxxxxxxx | Branch pointer |
| 1A,22,2A,32,3A | xxx----- | AK (individual attack parameter) |
| | ---xxxxx | AKC (individual attack counter) |
| | xxxxxxxx | DRC (individual decay/release counter) |
| 1B,23,2B,33,3B | 000xxxxx | LNEXP table address |
| 1C,24,2C,34,3C | xxxxxxxx | ΔEA.L (during attack) |
| | xxxx---- | EL—current envelope level |
| | ----xxxx | ELC—envelope level counter |
| 1D,25,2D,35,3D | xxxxxxxx | ΔEA.H (during attack) |
| | xxxxxxxx | TE—transient exponent |
| 1E,26,2E,36,3E | xxxxxxxx | EA.L—envelope amplitude (low byte) |
| 1F,27,2F,37,3F | xxxxxxxx | EA.H—envelope amplitude (high byte) |

Figure 3:
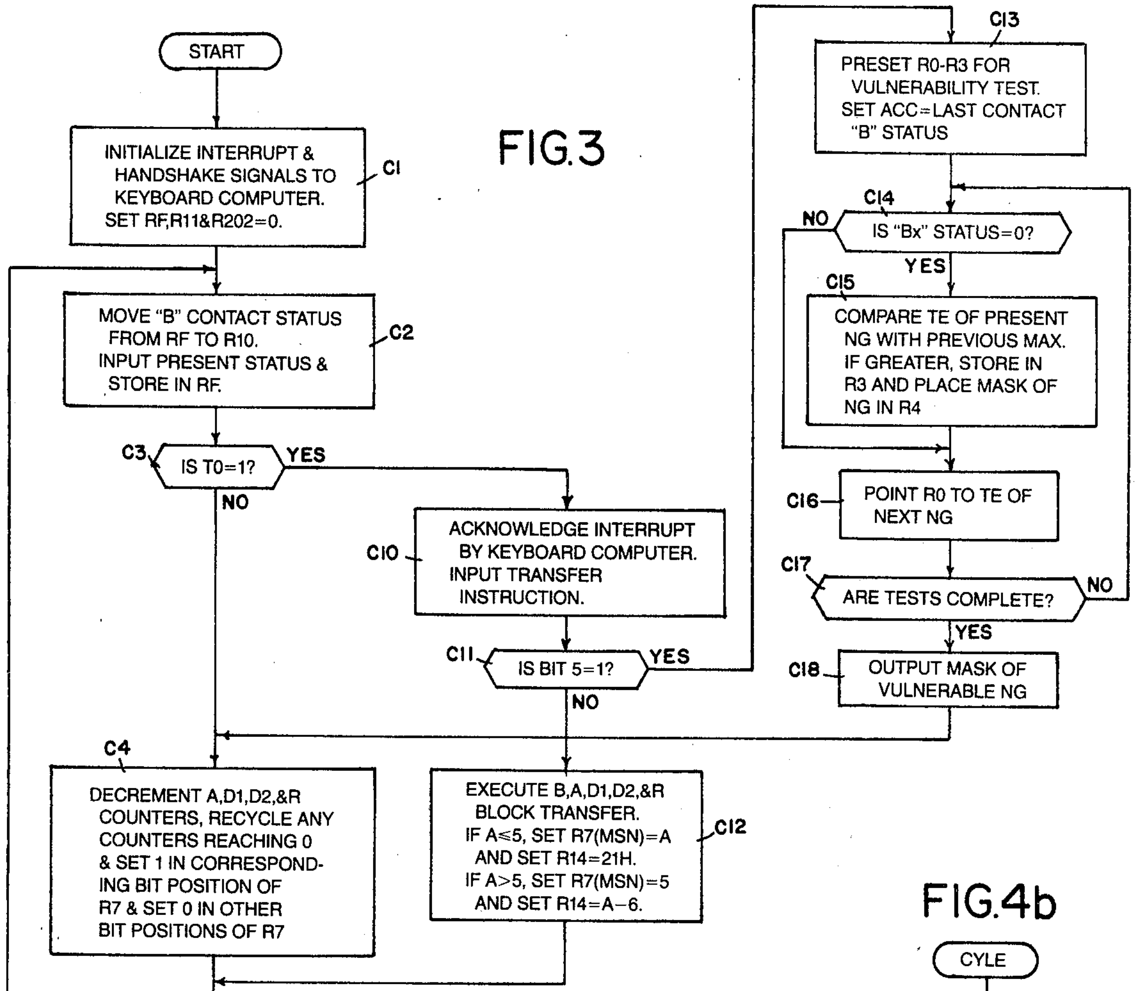
FIG. 3 is a flow chart of the program used in a second microcomputer, shown in FIG. 1*b*, that generates five envelopes simultaneously.
Figure 3:
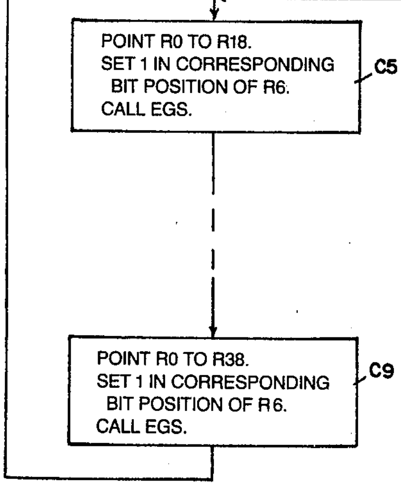

When power is applied to the computer 200 an internal reset pulse is generated to clear critical working resisters, such as the program counter. After the keyboard computer 100 has completed its initialization routine, it sets port 21=1 which terminates the reset pulse in computer 200 and allows operation under program control to commence at location 0 in the program memory. The program memory listing is shown in Table X, which appears at the end of the specification, but for simplicity the operation will be described with reference to the flow charts shown in FIGS. 3 and 4. A modified program listing is shown in Table XII. Operation with the modified program is described separately in Section IV.

In block C1: 01H is output to register 203 to initialize the $\overline{\text{INT}}$ and T0 outputs of computer 100 to 1 and 0, respectively. Register 202 is set=0 to indicate all EG's are idle. RF and R11 are set=0 so as to cause the random initial envelope amplitudes EA.L and EA.H in R1E-R3E and R1F-R3F to be set=0 by the program, as described later.

In block C2: R10 is set=RF and RF is then set=register 102.

In block C3: the test input T0 is checked to see if the keyboard computer is requesting a software interrupt. This is invariably the case upon turn-on, hence the program branches to C10.

In block C10: the software interrupt is acknowledged by setting the T0 input of the keyboard computer=1 via register 203. A transfer instruction is then input via register 102.

In block C11: bit 5 of ACC is tested to interpret the instruction. Bit 5 is invariably false upon turn-on, requiring a block transfer of attack/decay parameter control data. Hence the program proceeds to block C12.

In block C12: the five quantities BC,A,D1,D2 and R are input in sequence from register 102 and are stored in R13-R17. These quantities have all been modified in form from the data that is input to the keyboard computer from the manual controls so as to take into account the manner in which the envelope computer implements the desired functions. These conversions were mentioned previously in the description of the keyboard computer and are shown there in Table II. The quantities D1,D2 and R, in particular, take the form of a preset count value located in the 5 LSBs used as a counter and the same preset value, expressed as a power of two, located in the 3 MSBs for use in resetting the counter. The quantity A takes either of two forms. In the first form A has a value between 0 and 5 (attack parameter=0 to A in Table II) corresponding to powers of two by which the attack slope is to be varied. Quantities of A in this range are moved to the MSN of R7 for use as the attack common exponent, as explained later. In this case R14 is set=21H to cause the A counter to recycle on every pass, as explained later. In the second form of A, (attack parameter=B to F in Table II) as output from the keyboard computer, the input quantity is similar to the D1,D2 and R form, but is increased by 6 to compensate for the effects of processing the data to obtain the attack common exponents. The program now skips over block C4 and returns to the main loop at block C5. Normally, the main program proceeds from block C3 to block C4.

In block C4: the A,D1,D2 and R counters, comprising the five LSBs of R14-R17, are each decremented by one. If any counter reaches 0, a corresponding bit position in R7 is set=1 and the counter is reset in accordance with the control parameter stored in the 3 MSBs of the same register. These three bits may represent any value from 1-6. The corresponding values to which the counter is preset are 00001, 00010, 00100, 01000, 10000, and 00000. The effect of these different preset values is to cause the flag bit in R7 to recur in every pass, every 2nd pass, every 4th pass, every 8th pass, every 16th pass, or every 32nd pass. Each flag remains set for only one pass following that in which the corresponding counter reaches 0.

In block C5: R0 is set=18H to point to the first register in the set dedicated to EG1. R6 is set=1 for use as a mask corresponding to EG1. The subroutine EGS is then called. Upon completion of the subroutine the program proceeds to Block C6 (not shown).

In blocks C6-C9: R0 is set=20,28,30 or 38 on successive returns from subroutine EGS and R6 is set=2,4,8 or 10H for use as a mask. Upon the fifth return the program loops back to C2 and repeats the above sequence.

Figure 4B:
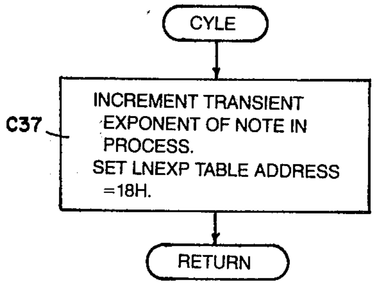
FIGS. 4*a*, 4*b*, 4*c* and 4*d*, are flow charts of subroutines used in the above envelope computer.
Figure 4C:
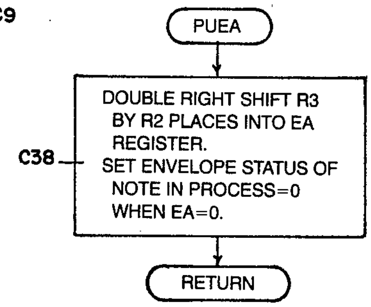
Figure 4D:
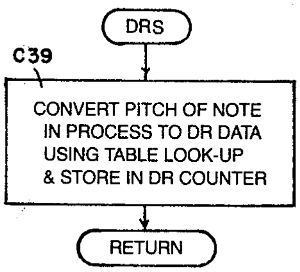
Figure 4A:
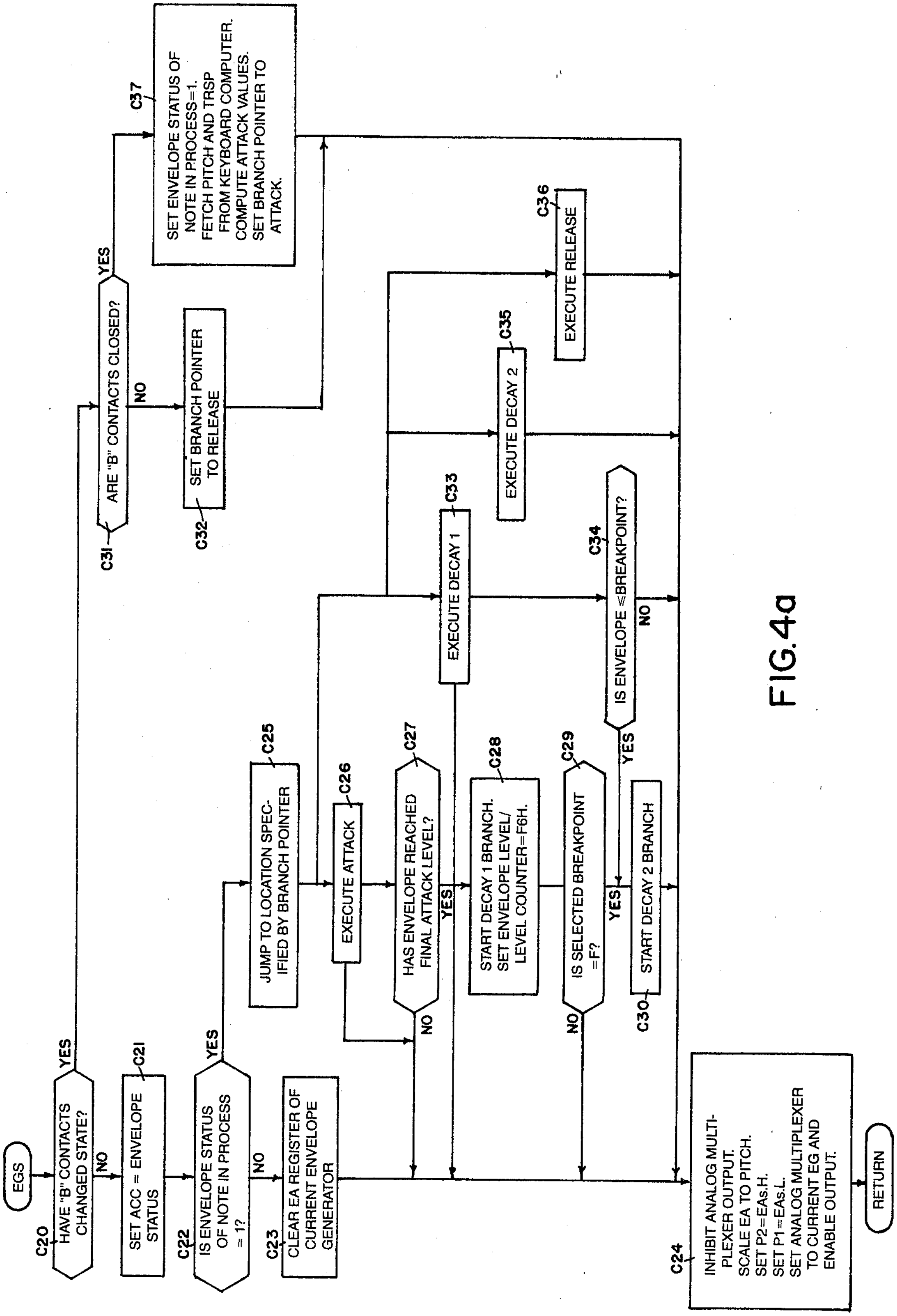

The operation of the EGS subroutine, shown in FIG. 4a, is described next.

In block C20: RF is exclusive-or'ed with R10 and masked with R6 to test for a change in state of the "B" contacts of the key to which the current EG is assigned. Before any keys are depressed, the result is always 0 and the program proceeds to C21.

In block C21: the accumulator ACC is set=R11, which holds the envelope status of EG1-EG5.

In block C22: ACC is masked with R6 to test the envelope status of the current EG. Assuming that the result is 0, the program proceeds to C23.

In block C23: the 16 bit envelope amplitude EA held in register pairs R1E,R1F-R3E,R3F; of the EG in process is cleared to 0.

In block C24: the analog multiplexer 205 is disabled via register 204. The 16 bit envelope amplitude is scaled down inversely with the pitch of the current note, held in R18-R38 and graduated in half-octave intervals. This scaling adjusts the envelope amplitude to make the output of the first voltage-controlled filter (VCF-1), such as 370, associated with the EG in process independent of the pitch of the selected note. Ports 1 and 2 in their entirety are then set=EA. Ladder network 206 converts the 16 bit digital envelope to an analog voltage that is buffered by an operational amplifier 207 before being directed to the analog multiplexer 205. Finally this multiplexer is pointed to the current note generator and is enabled to drive the corresponding clamp-and-hold circuit, such as 351. A two stage RC filter is employed for this circuit to smooth the steps in the envelope waveform so as to render them inaudible. Applicant has found that abrupt steps as small as 0.25 db are distinctly audible with long decay times. The program finally returns to the main loop, where it either advances to the next EG or returns to the beginning at C2.

Now assume that a playing key has been depressed fully and the keyboard computer has assigned EG1 to the note, which may be $C_5$ as assumed previously. It will be recalled that the keyboard computer set register 102=1 in response to closure of the "B" contacts of playing key $C_5$. Hence when the envelope computer calls EGS from block C5 (FIG. 3), the subroutine program branches from C20 to C31 (FIG. 4*a*).

In block C31: RF is masked by R6 to test the present state of the "B" contacts. Finding them closed, the program branches to C37.

In block C37: bit 0 of R11 is set=1 to mark EG1 busy. The keyboard computer is interrupted via register 203 and the mask in R6 is sent via register 202 to identify the EG requesting data. The keyboard computer responds to this request by sending the pitch and touch response data via register 102, which is input to R18 in the present instance. An attack characteristic is then calculated as described in the following.

It is desired that the attack waveform be a ramp implemented by incrementing a register by a selectable amount at periodic intervals until a level set by the touch response data is reached. Hence the size of the selectable increment is a function of both the attack time and the touch response. It is further desired that the attack time vary from a normalized value, selected by the parameter control, in accordance with the pitch of the note being played.

6 db intervals in touch response can readily be allowed for by shifting the normalized value of the increment; but, since it is desired that touch response intervals of 3 db be provided, the pitch data is right normalized, left-shifted one bit, and incremented by one if the touch response data is odd (i.e. includes a 3 db increment). The combined pitch and odd/even touch response data is then used to establish an initial envelope increment valua (INTB) by Table IV (located at 304-313 in the program memory) which is scaled to provide the desired relation between pitch and attack time.

TABLE IV

| PITCH | TRSP (Bit 0) | INTB |
|---|---|---|
| 2 | 0 | 1B |
| 2 | 1 | 26 |
| 3 | 0 | 20 |
| 3 | 1 | 2D |
| 4 | 0 | 26 |
| 4 | 1 | 36 |
| 5 | 0 | 2D |
| 5 | 1 | 40 |

TABLE IV-continued

| PITCH | TRSP (Bit 0) | INTB |
|---|---|---|
| 6 | 0 | 36 |
| 6 | 1 | 4C |
| 7 | 0 | 40 |
| 7 | 1 | 5B |
| 8 | 0 | 4C |
| 8 | 1 | 6C |
| 9 | 0 | 5B |
| 9 | 1 | 80 |

The remaining touch response factor TRS (bits 1-3 of TRSP) is combined with the attack common exponent. The 16 bit length of the envelope amplitude and envelope increment registers is insufficient to allow determination of the attack slope solely by right shifting the increment INTB obtained from Table IV. Hence, a counter is used to vary the step width as well as the heigth. The attack common exponent, held in the MSN of R7, is the number of right shifts to be performed on the value of the increment derived from Table IV. The remaining touch response parameter TRS has a range of 0-7. corresponding to an audible range of 0-42 db. Higher values of TRS require correspondingly higher values of the attack increment, hence correspondingly fewer right shifts of the increment value (INTB) read from Table IV.

TRS is complemented, with respect to 7, and the complement, CTRS, is added to the attack common exponent ACE from R7. If the result is $<8$, INTB is right-shifted (ACE+CTRS) bits and the individual AKC counter, R1A-R3A, is set=21 to minimize the step width. If the result is $\geq 8$, INTB is right-shifted 7 bits and the remainder (ACE+CTRS−6) is set into R1A-R3A, in the same form as the common A,D1,D2 and R counters in R14-R17, to increase the step width accordingly. The required value of INTB is placed in EA, in the corresponding register pair R1C,R1D—R3C, R3D. Finally, the branch pointer (R19-R39) is set=B7H so that the program will branch to block C26 on the next pass.

In block C24: the output of the analog multiplexer 205 is inhibited. The envelope amplitude EA is scaled to the pitch stored in the MSN of R18-R38 and ports 1 and 2 are set=EAs, the scaled value of the envelope. The program shown in Table X is arranged to optionally omit this scaling of amplitude with pitch when the T1 input (not shown) of the envelope computer is set to a logic 1 level (see instruction 0A4). The analog multiplexer 205 is then pointed to the VCF controller of the current note generator and enabled via register 204. Finally the EGS subroutine returns to the main program. EA is usually=0 when block 24 is entered from block C37, hence the scaling operation has no effect. However, when a note is repeated before it has fully decayed, the value in EA when the key is struck again is preserved and the attack resumes from that value at a rate controlled by the new key velocity, or touch response. EA is always=0 when block C24 is entered from block C23. In this case the function of block C24 is to maintain the clamp-and-hold inputs of inactive note generators at their minimum level to prevent ciphers.

When note $C_5$ is again serviced by EGS on the next pass of the program through its main loop, the program proceeds from C20 through C21, C22, and C25 to the attack branch at C26.

In block C26: The A counter flag in R7 is tested, if it is=0 the program branches directly to block C24, otherwise the individual attack counter AKC is decremented before branching to C24. If AKC reaches 0, it is reset using AK; and ΔEA is added to EA to increase the envelope amplitude one step on the attack ramp. The touch response data TRSP is then used to obtain the corresponding final envelope value, using the look-up table shown in Table V and located at 314-323 in the program memory, which is compared with the present envelope value, in block 27.

TABLE V

| TRSP | FINAL AMPLITUDE |
|---|---|
| 0H | 01H |
| 1 | 02 |
| 2 | 03 |
| 3 | 04 |
| 4 | 06 |
| 5 | 08 |
| 6 | 0B |
| 7 | 10 |
| 8 | 17 |
| 9 | 20 |
| A | 2D |
| B | 40 |
| C | 5A |
| D | 80 |
| E | B5 |
| F | FF |

In block C27: if the present envelope value is below the final value the program branches to C24. When the final value is reached, following a number of passes through the main loop, the program proceeds to C28.

In block C28: the branch pointer R19-R39 is set=BAH to cause a branch to block C33 on the next pass. If the LSB of TRSP is 0, LNEXP (R1B-R3B) is set=OCH; if it is 1, LNEXP is set=18H. LNEXP is the address of a linear-to-exponential table shown in Table VI and located at 324 to 33B in the program memory. The contents of the table increase in 0.25 db intervals from 84H (132D) at 324 to FFH (255D) at 33B. The 3 MSBs of TRSP are right normalized and subtracted from 7 to obtain TE, which is stored in R1D-R3D since ΔEA is no longer needed. During decay and release modes the envelope amplitude is obtained by reading the linear-exponential table at the address LNEXP and double right-shifting the data TE bits, hence TE is the power of two by which the data from the table is divided to obtain the envelope. The right-shifted value of the data read from the table at OCH or 18H is stored in EA.

TABLE VI

| LNEXP INPUT | EXPONENTIAL OUTPUT | | |
|---|---|---|---|
| 01H | 84H | = | 132D |
| 02 | 88 | | 136 |
| 03 | 8C | | 140 |
| 04 | 90 | | 144 |
| 05 | 94 | | 148 |
| 06 | 98 | | 152 |
| 07 | 9D | | 157 |
| 08 | A1 | | 161 |
| 09 | A6 | | 166 |
| 0A | AB | | 171 |
| 0B | B0 | | 176 |
| 0C | B5 | | 181 |
| 0D | BA | | 186 |
| 0E | C0 | | 192 |
| 0F | C5 | | 197 |
| 10 | CB | | 203 |

TABLE VI-continued

| LNEXP INPUT | EXPONENTIAL OUTPUT | |
|---|---|---|
| 11 | D1 | 209 |
| 12 | D7 | 215 |
| 13 | DE | 222 |
| 14 | E4 | 228 |
| 15 | EB | 235 |
| 16 | F2 | 242 |
| 17 | F9 | 249 |
| 18 | FF | 255 |

Pitch (R18-R38) is used to form the address of Table VII, located at 33C-345 of the program memory, from which the data for counter DRC (R1A-R3A) is obtained. This data provides the desired variation in decay/release times, from the nominal value selected by the manual parameter controls, in accordance with the pitch of a selected note.

TABLE VII

| PITCH | DRC |
|---|---|
| 2H | 0AH |
| 3 | 09 |
| 4 | 08 |
| 5 | 07 |
| 6 | 06 |
| 7 | 05 |
| 8 | 04 |
| 9 | 03 |
| A | 02 |
| B | 02 |

The present envelope amplitude EA is the final amplitude value established by TRSP and Table V. The breakpoint level B is with reference to this maximum value. B has a range of 0-F with a resolution of 1.5 db. To detect variations in envelope amplitude of 1.5 db during its decay, the current envelope level and envelope level counter held in R1C-R3C is provided. This register is initially set=F6H when the envelope is at its peak. The counter is decremented by 1 each time the envelope is attenuated by 0.25 db until the counter reaches 0. It is then reset to 6 and the current envelope level is decremented by 1. Accordingly, R1C-R3C is now set=F6H. The break level complement BC is then tested. If B≠F, the program branches to C24. If B=F, the program proceeds to C30.

In block C30: the branch pointer R19-R39 is set=BDH to cause the program to skip the decay 1 branch and instead branch to block C35 on the next pass.

In block C33: the D1 counter flag in R7 is tested. If it is=0 the program branches directly to C24, otherwise DRC is decremented before branching to C24. If DRC reaches 0 it is reset, using a subroutine DRS described later, and LNEXP is decremented. The data is read from the LNEXP table at the new address. This data is 0.25 db less than the previous location. It is then double right-shifted as before by TE bits and stored in EA. ELC is also decremented. In the event ELC reaches 0 it is reset to 6 and EL is decremented. The new value of EL is compared with B by addition and testing for a carry.

In block C34: if EL>B the program branches to C24, otherwise it branches to C30 where the branch pointer R19-R39 is set=BDH to cause a branch to C35 on the next pass, instead of C33.

In block C35: the operations in the decay 2 mode are identical to those in the decay 1 mode; except that El, ELC are not involved since no further envelope level testing is required, and the D2 flag in R7 is tested instead of D1 to determine when the individual DRC counter is to be decremented. The program continues to branch to C35 as long as the playing key remains depressed. When the "B" contacts are opened upon release of the key the program branches from C20 to C31 and thence to C32.

In block C32: the branch pointer R19-R39 is set=-COH to cause the program to branch to C36 on the next pass. The program branches to C24 in the current pass.

In block C36: the operations in the release made are identical to those in the decay 2 mode, except that the R flag in R7 is tested instead of D2 to determine when the individual DRC counter is to be decremented. The program continues to branch to C36 until EA reaches 0, or until this envelope generator is reassigned by the keyboard computer. When EA reaches 0 the envelope status is set=0 in R11 by the PUEA subroutine described in the following. This causes the program to branch from C22 to C23 instead of C25 on subsequent passes.

There are many repetitive operations occurring in the preceding description. To conserve program memory space, several additional subroutines are used to perform these operations within the primary envelope generator subroutine EGS.

The first of these subroutines is CYLE, shown in FIG. 4*b*, which is called whenever the LNEXP table address R1B-R3B reaches 0. CYLE recycles the table address to 18H and increments TE in R1D-R3D, then returns control to EGS. CYLE is located at 2E6-2EE in the program memory.

The next subroutine PUEA, shown in FIG. 4C, is called to process and update EA whenever the envelope is incremented or decremented.

Before PUEA is called the data to be processed (such as data read from the LNEXP table) is loaded into R3 and the exponent of 2 by which the data is to be divided is loaded into R2. PUEA then double right-shifts the 8 bit data by R2 places and stores the 16 bit result in EA. The result is tested and if EA=0, the envelope status of the note in process is set=0 in R11. PUEA is located at 2C0-2E5 in the program memory.

Another subroutine DRS, shown in FIG. 4*d*, is used to recycle the counter DRC in the D1, D2, and R branch operations. DRS converts the pitch R18-R38 of the note in process to a corresponding preset value obtained from Table VII (shown above) and stores it in DRC. The DRS subroutine is located at 2EF-2FB.

It was previously noted in the description of the keyboard computer that in the event that there is no idle note generator, but there are two or more vulnerable note generators; the keyboard computer interrupts the envelope computer and requests it to identify the vulnerable note generator having the lowest amplitude. It was also previously noted that a software interrupt of the envelope computer results in a branch from C3 via C10 to C11 (FIG. 3) where the transfer instruction is interpreted. In the previous description of the interrupt, bit 5 of the instruction was a 0, signifying that a block transfer of B,A,D1,D2 and R data was required. When bit 5 is a 1, the program branches to C13.

In block C13: ACC is set=last status of "B" contacts, R10. R0-R3 are initialized for the vulnerability test. The status of the "B" contacts of the first note generator are then examined in C14.

In block C14: if the note generator being tested has not been released the program skips to C16, otherwise it proceeds to C15.

In block C15: TE (R1D-R3D) of the note generator under test is compared with the previous maximum value, which is held temporarily in R3. If the present TE is greater it is placed in R3 and a mask of this note generator is placed in R4.

In blocks C16 and C17: the program loops back to C14 until all five note generators have been tested, then proceeds to C18.

In block C18: the mask of the vulnerable note generator having the highest TE (lowest amplitude) is output to register 202 to identify it to the keyboard computer.

The above described method of selecting the most vulnerable note generator is limited in accuracy to the resolution of TE, but has been found adequate for this purpose. For greater accuracy, the absolute values of the envelope EA can be used in lieu of TE, but this requires more instructions, more free registers, and more execution time.

IV Computer Operation With Modified Programs

The operations described in the preceding sections occur when the program shown in Tables IX and X are used in the keyboard and envelope computers. Alternative versions of these programs are shown in Tables XI and XII, respectively. The changes in operation which occur when using the modified programs are described in the following.

One object of the alternative programs is to provide the envelopes with both nominal and pitch scaled amplitudes simultaneously, rather than optionally. This requires the use of additional output circuitry, as shown in FIG. 5, which is also described in the following. Another object is to provide finer gradation of the envelope time constants by the $AD_1D_2BR$ presets. Still another object is to cause the envelope amplitude to vary as the square of the key velocity, rather than linearly, so as to obtain the desired dynamic range with less variation in key velocity; which facilitates rapid playing of soft passages.

The first object is easily accomplished because the envelope amplitudes EA are stored in normal amplitude form and are scaled in accordance with the pitch only when they are being output to ladder 206, as described previously under block C24. In the revised envelope computer program the nominal value of EA is output to register 204A via port 0 in block 24 before the scaling procedure takes place. Register 204A is set from port 0 and drives ladder 206A, having its output connected to analog multiplexer 205A through buffer 207A. The logic inputs to 205A are driven by the original register 204 to direct the nominal envelopes to the five note generators in synchronism with the pitch-scaled envelopes.

The last object is attained by revising the algorithm implemented by instructions 08F-OBB by the keyboard computer program, described previously under block B40. In the revised algorithm TRSP is set=F if the elapsed time between key contact closures is ≦4, or is set=0 if the elapsed time is ≧40. If neither of these conditions is true, the leading zeros are counted, decremented by 1, and then multiplied by 4. The result is then decremented by 2 if the first bit following the leading 1 is=1 and by 1 if the second bit following the leading 1 is=1. The resulting value of TRSP is an approximation to the desired exponential and consists of three linear segments. The first algorithm required a 64:1 change in key velocity to produce a 36 db change in envelope amplitude, whereas the revised algorithm requires only an 8:1 change in key velocity.

Another change made in the keyboard computer program affects the block transfer of the B,A,D1,D2 and R parameters described previously under block B16. With the revised program the B parameter is complemented as before, but the other parameters are transmitted unaltered. Hence the conversions shown in Table II are not applicable. An alternative conversion is performed in the envelope computer, as later described herein. The keyboard program modification is effected by inserting NOP's in locations 225-228 23C-244, and 257-25A.

The remaining object of providing finer gradations in envelope control is accomplished in one manner for the attack phase and in a second manner for the decay/release phases. Considering the attack phase, as previously described under block C37 the pitch data is combined with the odd/even touch response data to establish an initial envelope increment value INTB by Table IV. Since the data stored in the odd locations of this table are 3 db greater in value than that stored in the next lower even location, this approach allows the slope of the attack ramp to be varied in 3 db steps, i.e. by a factor of $\sqrt{2}$, to compensate for 3 db variations in the final amplitude, which is selected by the touch response value TRSP, but does not provide for 3db variations in slope by the attack parameter A. In the revised envelope computer program this table is rearranged by interchanging the odd and even data values and then doubling the values in the odd locations, as shown in Table IVA. To use this table, the program complements bit 0 of the attack parameter and exclusive-ors it with bit 0 of the touch response data. The pitch of the selected note is right normalized and left shifted one place as before and the exclusive-or term ($\overline{A}_O \oplus TRSP_O$) is then introduced in the 0 bit position. The result is used to address Table IVA to obtain INTB. Assuming, for example, that note $C_5$ has been selected, then the pitch=9 and either 80 or B6 is read from the table depending on the state of the exclusive-or term. $\overline{A}_O$ is then added to TRSP and the sum is right shifted one place to obtain TRS as before; but TRS now has a range of 0–8, rather than 0–7, as a result of the addition of the attack bit $\overline{A}_O$.

TABLE IVA

| PITCH | $\overline{A}_o \oplus TRSP_o$ | INTB |
|---|---|---|
| 2 | 0 | 26H |
| 2 | 1 | 36 |
| 3 | 0 | 2D |
| 3 | 1 | 40 |
| 4 | 0 | 36 |
| 4 | 1 | 4C |
| 5 | 0 | 40 |
| 5 | 1 | 5A |
| 6 | 0 | 4C |
| 6 | 1 | 6C |
| 7 | 0 | 5B |
| 7 | 1 | 80 |
| 8 | 0 | 6C |
| 8 | 1 | 98 |
| 9 | 0 | 80 |
| 9 | 1 | B6 |

TRS is complemented, with respect to 8 now rather than 7, and the complement CTRS is added to the attack common exponent ACE from R7 as before to determine the number of right shifts to be performed on INTB. The resulting value is placed in EA in the corresponding register pair R1C,R1D—R3C,R3D as before. This value is "80" if the attack parameter A=0 (minimum attack time) and TRSP=F (maximum envelope amplitude), since $\overline{A}_O=1$ and $TRSP_O=1$ result in no right shifting of INTB. If A is increased to 1 or TRSP is decreased to E, but not both, then "B6" is read from the table as INTB; which is then right shifted one place to become EA="5B". If A=1 and TRSP=E, then "80" is read from the table as INTB; which is then right shifted one place to become EA="40".

Now considering the decay and release phases D1,D2 and R, as shown in Table VI and described under blocks C28 and C33, the envelope amplitude is decremented in increments of 0.25 db by incrementing the table address LNEXP by 1. Gradations in decay rate are produced by varying the range of the common and/or individual counters that control the time duration between increments. The program provides for selection of time intervals in 6 db steps; i.e. in multiples of $2^n$ where n is an integer. To provide finer gradation, Table VII could be enlarged to provide a second set of preset values for DRC ranging from 3 to E in addition to the 2 to A range shown. This would provide for variations in step width of approximately 3 db. A preferable approach is employed in the modified program, shown in Table XII, in which provisions are made for incrementing LNEXP by 2,3,4,6,8 or 12 steps at a time. This enables the desired finer gradation to be obtained and also allows faster decay rates to be achieved at times with no change in computer speed. The values of step size to be employed in each of the three decay modes is designated ΔD1, ΔD2, and ΔR.

A table is added to the envelope computer program to aid in establishing the required values for ΔD1–ΔR. This table is located at addresses 344-34D and is shown in Table VIII, in which column ΔDDR shows the data stored in the first four locations and column XPS,XCTR shows the data stored in the next six locations. Following a block transfer of B,A,D1,D2 and R parameters, described previously under block C12, bit 0 of A (or $A_O$) is complemented and stored in the bit 7 position of R7. D1 is then tested and if ≦4 the corresponding value of ΔD1 is read from the table and is subsequently stored in the LSN of R13 along with BC. "21" is stored in R15 to cycle the D1 counter at its maximum rate. If D1>4 the corresponding value of XPS,XCTR is read from the table and stored in R15. "3" is stored in ΔD1 is even, or "2" is stored in ΔD1 if D1 is odd. D2 and R are operated on in like fashion to obtain corresponding values of ΔD2 and ΔR2, which are stored in the LSN and MSN halves of RE, respectively. The corresponding values of XPS,XCTR are stored in R16 and 17, as before.

TABLE VIII

| DDR | Δ DDR | XPS,XCTR |
|---|---|---|
| 0 | 0C | 21 |
| 1 | 08 | 21 |
| 2 | 06 | 21 |
| 3 | 04 | 21 |
| 4/5 | 3/2 | 21 |
| 6/7 | 3/2 | 42 |
| 8/9 | 3/2 | 64 |
| A/B | 3/2 | 88 |
| C/D | 3/2 | B0 |
| E/F | 3/2 | 00 |

Another modification in the program shown in Table XII is made to prevent premature release due to key contact chatter or player error. The operations described under block C32 are deleted, hence the program flows from block C31 directly to C24 in the first pass following opening of the "B" contacts. (see FIG. 4*a*). On subsequent passes the program branches in block C22; but now goes to block C40, in lieu of block C25, as shown in FIG. 6.

In block C40: with the "B" contacts open the program flows to block C41 in lieu of block C25.

In block C41: the branch pointer is tested and, if found set to attack, the program branches to C26 to continue execution of the attack phase until it is completed and the decay 1 phase is entered. On the next pass following the completion of attack the program flows from block C41 to block C36 to initiate execution of the release phase.

V. Operation of the Note Generator

The note generator 300, shown in the lower half of FIG. 1*b*, is an improvement on the note generator previously disclosed by the present inventor in U.S. Pat. No. 4,070,943, entitled "Improved Organ Keying System", issued Jan. 31, 1978. Harmonics of sine wave form having sufficient purity for use in additive synthesis of musical tones were provided therein by a novel circuit arrangement that also functioned as a keyer. The circuit arrangement comprised a resistive path between a square wave tone source, in the form of a binary divider, and a tone utilization circuit; and a transistor switch connected in the resistive path so as to increase the absolute value of tone current during the second and third quarters of each half-cycle. The transistor switch was operated by an exclusive-or gate having its inputs driven by divider stages one and two octaves above that used as the square wave tone source. By appropriate choice of the relative magnitudes of the steps in the resulting waveform, the third and fifth harmonics were effectively eliminated. The remaining harmonics were effectively eliminated by a low pass filter, or integrator, in the utilization circuit. In the improved system there is no need for the transistor switches; instead a ROM (read-only memory), or equivalent logic circuitry, with a unique bit pattern and appropriately weighted resistive outputs provides the desired waveshape. The size of the ROM used in the illustrative embodiment was determined in part by what is commercially available. Texas Instruments type 74S470 (256W×8B) was chosen for ROM 307 and type 74S188 (32W×8B) was chosen for ROMs 308 and 309. These are read-only memories that are programmable by blowing fusible links (PROMs).

There must be an integral number of cycles of each harmonic for each pass through the memory. Thus there must be 3 cycles of S3H (sub-third harmonic), 6 cycles of 3H, 10 cycles of 5H, and 12 cycles of 6H programmed in ROM 307. Since the top note of the keyboard is $C_7$ with a fundamental pitch of 2093 hz, the memory must be accessed (2093÷2)W times per second, where W is the number of words in the memory. For W=256, the access rate is 268k/sec. The circuitry has been arranged to access alternate locations for the top octave, effectively making W=128, which reduces the oscillator frequency to a value more suitable for the preferred VCO (Teledyne 9400).

Referring now to FIG. 1*b*, VCO 301 operates continuously at a selected one of 12 frequencies between 70,969 hz and 133,952 hz. The frequency is determined by a network of precision resistors 302 which are switched between −5 volts and +5 volts by the shift-and-store register 303. A low frequency VCO, common to the five NG's, is provided to produce a vibrator effect. Register 303 also controls a dual multiplexer 305 to select octave submultiples of the VCO frequency from counter 304 to drive the second counter, or divider, 306 and ROMs 307 and 308. For the top octave, the LSB of the address input of these ROMs is held constant and the 2nd LSB is connected directly to the top output of counter 304. Since there is then one memory access for each VCO cycle, this connection provides the required 134k/sec access rate of 128 locations for the highest note, $C_7$. For the next lower octave the LSB is connected to the top output, thereby providing a 134k/sec access rate of 256 locations for the next highest note, $C_6$. For each succeeding lower octave the LSB is connected to correspondingly lower stages of counter 304. ROM 309 produces output signals at ¼ the frequency of ROM 308, hence its address inputs are connected to correspondingly lower frequency outputs of counter 306.

The four pulse type waveshapes each require only one bit of each memory word. Two locations of the 16′P bit store 1's and 30 locations store 0's. The 16′P output, (all are open-collector type) is concerned through resistor 314 to an output of clamp-and-hold 111 and through a diode 315 to a resistive divider network 316-318. The divider network scales the inputs to preamp 319 so as to compensate for the roll-off of VCF-1 (370), which is a tracking type of damped integrator. The diode 315 can be replaced by a resistor, but the diode is preferred because it provides a threshold above the $V_{SAT}$ output of the ROMs, which are bipolar devices. If ROMs having field-effect type output transistors are used there is no need for this diode.

The nine sine type waveshapes each require two bits of each memory word. One of these bits is programmed with a square wave pattern; for example, the SH has one bit with 16-1's followed by 16-0's. The other bit is programmed with the inverted exclusive-or function (f⊕2f′4f), where f is the frequency of the square wave. Thus the other bit of SH has 4-1's, 8-0's, 4-1's, 4-0's, 8-1's, and 4-0's in succession. If the first bit is designated A and the other B, the sequence of logical combinations occurring in one cycle is $A\bar{B}$, AB, $A\bar{B}$, $\bar{A}B$, $\bar{A}\bar{B}$, and $\bar{A}B$.

The two ROM outputs for a given harmonic are each connected through a resistor, such as 310 and 311, to a single output of clamp-and-hold 111, and through a diode, such as 312 and 313, to the resistive divider 316-318. The resistors 310 and 311 are chosen to have a ratio of approximately 2.5:1, whereby the ratio of the peak signal to the first step in the resulting AC waveform at the output of amplifier 319 is approximately 2.3:1. As fully described in the prior U.S. Pat. No. 4,070,943, mentioned earlier, this waveshape is practically devoid of 3rd and 5th harmonics and contains no even harmonics. Alternatively, the resistors 310 and 311 may be equal and the desired weighting may be accomplished by connecting diodes 312 and 313 to different points on the resistive divider 316-318. The amplitudes of each of the harmonics, SH-8H, and each of the pulse waveshapes, 16′P-2′P, is independently controlled by a corresponding output of the clamp-and-hold 111.

The harmonics produced by ROM 307 are not identical to that described above for the SH since these harmonics are not related to SH by a factor $2^N$, where N is an integer. However, ROM 307 is programmed to provide waveshapes having 8 steps/cycle with step changes as near the desired ⅛ cycle intervals as possible with the 256 memory words available. The results have been found to be perfectly satisfactory for the intended purpose.

An alternative allocation of memory words which provides uniform width steps for the S3H, 3H, and 6H is possible if two different waveshapes are used. If the 8H has 6 steps/cycle and the 6H has 8 steps/cycle, both can be provided in a 48 word memory with no variations between the cycles of either one. Their submultiples may have proportionately more steps, or proportionately fewer words. The same sequence of logical combinations ($A\overline{B}$, AB, $A\overline{B}$, $\overline{A}B$, $\overline{AB}$, and $\overline{A}B$) is produced for the six steps/cycle waveform, the only difference being that each combination has a duration of 1/6 cycle. The reason the embodiment described above is preferable is because the 6 step waveform cannot be proportioned so as to effectively cancel both the 3rd and 5th harmonics. By choosing resistors 310 and 311 to have a ratio of 3:1 the 3rd harmonic is cancelled in the 6 step waveform. The ratio of the peak signal to the first step in the resulting AC waveform at the output of amplifier 319 is 2:1 in this case.

The signals developed across divider 316-318 are amplified and level-shifted by preamp 319 before reaching the input of VCF-1. VCF-1 is a conventional damped integrator (a low-pass filter with 6 db/octave roll-off), which may use a type 3080 variable transconductance amplifier for 371 and a type 3240 amplifier having MOSFET inputs for 372. The cut-off frequency $f_{col}$ of filter 370 varies directly with the current supplied to the control input of 371 by another variable transconductance amplifier 355 in the VCF controller 350. The current output of 355 is in turn proportional to the product of the current supplied to its transconductance control input by transistor 353 and the voltage produced at its—input by an output of clamp-and-hold 111. The latter is the FC1 signal produced by one of the parameter controls, or its equivalent from the capture memory. The current from transistor 353 is directly proportional to the envelope signal maintained on clamp-and-hold 351. Amplifier 352 (type 3240) developes a matching voltage across resistor 354 and thereby produces a proportional current in the collector of 353.

The circuit constants of controller 350 are chosen so that when FC1 is at its minimum value, a playing key is struck forcefully enough to produce the maximum touch response signal, and the envelope signal is at its peak; $f_{col}$ is near the subharmonic frequency of the selected note. The envelope signal is scaled to the pitch of the selected note by the program, hence the above statement holds true irrespective of which note is played. All of the signals above $f_{col}$ are attenuated by the filter in inverse proportion to their frequency, hence the pulse waveforms become sawtooths and the harmonic waveforms become practically pure sine waves. The resistive divider 316-318 pre-weights the digital signal representations to compensate for the attenuation of the desired harmonic signals. As the envelope decreases from its peak value, $f_{col}$ decreases proportionately. The output of filter 370 accordingly decreases proportionately with no change in the waveform of the signals since they all lie on the constant slope of 6 db/octave. Hence, under these circumstances, filter 370 actually performs the function usually performed by a VCA in addition to its filter function. The same thing occurs if the amplitude of the envelope is reduced as a result of a less forceful operation of the playing key. The envelope shape is unchanged, it is simply scaled down; hence the signal output of filter 370 is scaled down without effect on the waveshape.

The FC1 control enables the maximum value of $f_{col}$ to be increased from near the subharmonic to near the eighth harmonic, or anywhere in between. In this way the pulse input waveforms can be made to vary from sawtooths to pulse output waveforms as the envelope increases, either due to the force with which the playing key is struck or due to the envelope shape created by the ADR controls. Harmonic mixtures are likewise caused to vary in composition with the envelope amplitude.

The output of VCF-1 is connected to the input of VCF-2 (380), which is a modified two-pole Butterworth filter. A variable gain stage, comprising FET 386 and amplifier 387, is provided in a feedback path from the output of 385 to the capacitor 382 of the first stage to allow a variable amplitude peak to be produced at the cutoff point. The gate of FET 386 is connected to the output of clamp-and-hold 111 that is associated with the Q control. Amplifiers 383, 385 and 387 may be type 3240's and the variable transconductance amplifiers 381 and 384 may be type 3080's. The transconductance control inputs of 381 and 384 are connected in parallel to another variable transconductance amplifier 356 which is connected to the output of clamp-and-hold 111 associated with FC2 and a transistor 357, in like manner to 355, when transmission gate 359 is selected by operating switch 154 to one of its closed positions. The cutoff frequency $f_{co1}$ of VCF-2 is then varied in accordance with the envelope waveshape as modified by the FC2 control.

When switch 154 is operated to its other closed position, gate 358 is selected to connect the transconductance control of 356 to the resistor net 302 so as to vary $f_{co2}$ solely in accordance with the pitch of the selected note. In this case VCF-2 affects the timbre of all notes under control of the FC2 and Q controls, but independently of the signal amplitude. The gate 358 and resistor net 302 are low impedance relative to the control input of 356 so that linear voltage signals from net 302 produce exponential current inputs to 356.

When switch 154 is operated to its open position, transmission gate 360 is selected by logic gate 361. In this case a fixed current is supplied to the control input of 356 so that VCF-2 operates as a simple formant filter with a variable $f_{co2}$ controlled manually by the FC2 parameter control.

An analog multiplexer 388 controlled by register 109 connects the audio output 390 through mixing resistor 389 to either the output of 372 in VCF-1, or the first stage output of VCF-2 at 383's output, or the second stage output of VCF-2 at 385's output. This selection of output points allows the final roll-off rate of the filter to be varied from 6 db/octave to 18 db/octave. The FC1 and FC2 controls allow the corresponding cut-off frequencies $f_{co1}$ and $f_{co2}$ to be made equal, if desired, or to be separated by many octaves; whereby a wide range of tone colors and tone color variations with amplitude can be achieved.

TABLE IX

| LOC | -0 | -1 | -2 | -3 | -4 | -5 | -6 | -7 | -8 | -9 | -A | -B | -C | -D | -E | -F |
|---|---|---|---|---|---|---|---|---|---|---|---|---|---|---|---|---|
| | | | | | KEYBOARD COMPUTER PROGRAM | | | | | | | | | | | |
| 00- | 44 | E0 | 00 | C5 | 44 | F0 | 24 | B5 | B9 | 33 | 42 | 11 | 03 | F4 | F6 | 0B |
| 01- | 62 | B9 | 28 | BA | 01 | BB | 00 | BC | 01 | FA | 47 | 03 | 06 | 3A | 09 | 21 |
| 02- | D1 | 96 | 34 | 1A | FA | 53 | 03 | 03 | FD | 96 | 20 | 1A | 19 | F9 | 03 | CD |
| 03- | C6 | 06 | 04 | 15 | 12 | BC | 92 | 41 | 77 | 1B | 2C | E7 | 92 | 23 | 2C | 04 |
| 04- | 34 | B8 | 17 | A0 | F1 | 47 | 5C | C6 | 62 | 49 | 47 | 6A | D5 | AA | DB | C6 |
| 05- | 67 | FA | DC | C6 | 6B | FA | DD | C6 | 6F | FA | DE | C6 | 73 | FA | DF | C6 |
| 06- | 77 | C5 | B8 | 17 | F0 | 04 | 38 | 23 | 01 | 04 | 79 | 23 | 02 | 04 | 79 | 23 |
| 07- | 04 | 04 | 79 | 23 | 08 | 04 | 79 | 23 | 10 | C5 | AE | B8 | 26 | F0 | 4E | A0 |
| 08- | B8 | 33 | F0 | AD | B8 | 1F | FE | 18 | 67 | E6 | 87 | FD | 37 | 60 | 37 | C6 |
| 09- | AF | BE | FE | 1E | 1E | F7 | E6 | 93 | F7 | F6 | 9C | 1E | FE | 03 | F1 | F6 |
| 0A- | A5 | 03 | 07 | 04 | B3 | FE | A0 | B8 | 26 | F0 | B8 | 04 | 90 | 04 | 62 | 23 |
| 0B- | 0F | 04 | A6 | E6 | B8 | 1E | 04 | A5 | 23 | 08 | 04 | A6 | B8 | 17 | A0 | F1 |
| 0C- | 5C | 96 | E7 | F1 | 47 | 5C | 6C | CD | F1 | 4C | A1 | 04 | 62 | FB | 47 | 6A |
| 0D- | D5 | AA | DB | C6 | E9 | FA | DC | C6 | ED | FA | DD | C6 | F1 | FA | DE | C6 |
| 0E- | F5 | FA | DF | C6 | F9 | 04 | 61 | 24 | 13 | 23 | 01 | 04 | FB | 23 | 02 | 04 |
| 0F- | FB | 23 | 04 | 04 | FB | 23 | 08 | 04 | FB | 23 | 10 | C5 | 37 | AE | B8 | 25 |
| 10- | F0 | 5E | A0 | 18 | F0 | 5E | A0 | B8 | 04 | 90 | B8 | 00 | 80 | F2 | 11 | 24 |
| 11- | 0C | 04 | 62 | FB | 47 | 6A | D5 | AA | DB | C6 | 76 | FA | DC | C6 | 7A | FA |
| 12- | DD | C6 | 7E | FA | DE | C6 | 82 | FA | DF | C6 | 86 | B8 | 27 | F0 | AA | C8 |
| 13- | C8 | F0 | 4A | 37 | 12 | 76 | 32 | 7A | 52 | 7E | 72 | 82 | 92 | 86 | F0 | 37 |
| 14- | 5A | A9 | BA | 00 | B8 | 05 | 97 | 67 | F6 | A9 | E8 | 47 | FA | C6 | AC | 07 |
| 15- | C6 | 71 | 8A | 01 | 26 | 52 | B8 | 04 | 23 | 20 | 90 | 9A | FE | 36 | 5D | B8 |
| 16- | 00 | 80 | 8A | 01 | 26 | 64 | A9 | B8 | 26 | F0 | B8 | 04 | 90 | 9A | FE | 36 |
| 17- | 6F | F9 | 24 | 88 | 04 | 61 | 23 | 01 | 24 | 88 | 23 | 02 | 24 | 88 | 23 | 04 |
| 18- | 24 | 88 | 23 | 08 | 24 | 88 | 23 | 10 | C5 | AE | B8 | 25 | F0 | 4E | A0 | B8 |
| 19- | 33 | F0 | AD | B8 | 1F | FE | 18 | 67 | E6 | 96 | FD | A0 | 23 | FB | 68 | A8 |
| 1A- | FB | 47 | 6A | A0 | B8 | 17 | F0 | 04 | 36 | 1A | 24 | 47 | C5 | FC | 47 | 4C |
| 1B- | 37 | 51 | A1 | 04 | 62 | B8 | 38 | F0 | 03 | 80 | B9 | 08 | 91 | F0 | 03 | E8 |
| 1C- | E6 | C4 | 44 | 00 | 10 | 9A | 0F | 00 | 09 | 37 | 32 | CE | 44 | 5B | 74 | AD |
| 1D- | 81 | 47 | 53 | 0F | AD | 9A | F7 | B8 | 38 | F0 | 03 | FD | E6 | E0 | 44 | 95 |
| 1E- | FD | B9 | 02 | 91 | B9 | 38 | F1 | 03 | 20 | B9 | 08 | 91 | B8 | 16 | F0 | 37 |
| 1F- | 12 | F4 | 44 | C4 | B8 | 00 | 80 | B8 | 27 | A0 | 16 | FE | 04 | 11 | 04 | 08 |
| 20- | B0 | 00 | 9A | 0F | 09 | B8 | 3F | 30 | D0 | 53 | F0 | C6 | 1C | 09 | A0 | 47 |
| 21- | 53 | 0F | AA | 23 | E8 | 03 | 18 | EA | 15 | B8 | 37 | A0 | B6 | 51 | 95 | B9 |
| 22- | 04 | B8 | 3A | BA | 05 | BB | D0 | BC | 04 | 27 | 8A | 01 | 26 | 2A | 81 | 9A |
| 23- | FE | F0 | 37 | 53 | F0 | 36 | 35 | 91 | 8A | 01 | 18 | F0 | 47 | 6B | E3 | BB |
| 24- | E0 | EC | 45 | C6 | 57 | 26 | 45 | EA | 53 | B8 | 26 | F0 | 91 | 9A | FE | 36 |
| 25- | 4F | 24 | C5 | 9A | FE | 44 | 35 | 23 | C0 | 44 | 45 | B8 | 38 | F0 | 03 | E9 |
| 26- | E6 | 6D | 8A | 08 | 64 | F0 | 00 | 09 | 53 | F0 | AD | 44 | 86 | B9 | 38 | F1 |
| 27- | B9 | 08 | 91 | B8 | 02 | BE | 04 | 27 | AC | AD | 97 | A7 | FC | 67 | AC | 4D |
| 28- | 90 | 46 | 84 | AD | EE | 7C | 9A | 07 | 00 | 09 | 37 | 12 | 8F | 24 | D7 | 74 |
| 29- | AD | FD | 91 | 24 | D5 | 03 | F1 | F6 | AD | FD | 47 | E7 | E7 | 03 | 03 | E3 |
| 2A- | AD | B9 | 38 | F1 | 03 | F0 | E6 | AB | 2D | 37 | 2D | 24 | E0 | 03 | FB | E6 |
| 2B- | B7 | B8 | 10 | FD | 90 | 24 | EC | F0 | 03 | 28 | A9 | FD | D1 | C6 | C2 | FD |
| 2C- | A1 | 85 | 24 | EC | B8 | 38 | F0 | 03 | E9 | F6 | CD | 24 | C4 | 8A | 02 | 27 |
| 2D- | B8 | 32 | A0 | E8 | D2 | 55 | 86 | D6 | 36 | D6 | 05 | 85 | B8 | 38 | 44 | 00 |
| 2E- | 9A | F4 | 27 | B8 | 04 | 90 | B8 | 16 | B0 | 01 | B8 | 38 | A0 | 95 | 44 | 02 |
| 2F- | 8A | 01 | AF | D5 | F8 | B8 | 34 | A0 | F9 | 18 | A0 | FA | 18 | A0 | 64 | 40 |
| 30- | 01 | 04 | 0A | 0A | 11 | 14 | 1A | 14 | 21 | 24 | 2A | 1C | 31 | 34 | 3A | 24 |
| 31- | 00 | 06 | 4D | 28 | 10 | 16 | 5D | 33 | 20 | 26 | 6D | 39 | 30 | 36 | 7D | 41 |
| 32- | 22 | 09 | 4C | 49 | 12 | 19 | 5C | 51 | 22 | 29 | 6C | 60 | 32 | 39 | 7C | 78 |
| 33- | 05 | 08 | 4E | 90 | 15 | 18 | 5E | B4 | 25 | 28 | 6E | D4 | 35 | 38 | 7E | FF |
| 34- | B8 | 00 | 26 | 42 | 80 | B9 | 27 | 53 | 1F | AA | F1 | 4A | A1 | B9 | 1A | FA |
| 35- | 19 | 67 | E6 | 50 | F1 | E3 | 03 | 80 | BA | 08 | 90 | 77 | EA | 5A | 29 | 03 |
| 36- | E6 | A8 | 03 | 1F | 29 | 2A | 80 | B8 | 27 | F0 | B8 | 15 | B0 | FC | C8 | B0 |
| 37- | 01 | C8 | 67 | A0 | F6 | 7A | 18 | F0 | A8 | 80 | B8 | 15 | F0 | C6 | 86 | 10 |
| 38- | C8 | 10 | C8 | F0 | 64 | 72 | 2A | E7 | 53 | 70 | 03 | 20 | 61 | B8 | 04 | 90 |
| 39- | 9A | FE | 36 | 92 | 38 | 26 | F0 | B8 | 04 | 90 | 8A | 01 | 86 | 9C | 9A | FE |
| 3A- | B8 | 36 | F0 | AA | C8 | F0 | A0 | C8 | FO | A8 | C5 | FF | 93 | B8 | 37 | F0 |
| 3B- | 18 | 60 | A9 | 80 | 0E | 93 | 00 | 00 | 00 | 00 | 00 | 00 | 00 | 00 | 00 | 00 |
| 3C- | 00 | 00 | 00 | 00 | 00 | 00 | 00 | 00 | 00 | 00 | 00 | 00 | 00 | 00 | 00 | 00 |
| 3D- | 00 | 00 | 01 | 01 | 02 | 02 | 03 | 03 | 04 | 04 | 05 | 48 | 6A | 8E | B6 | C6 |
| 3E- | 21 | 21 | 42 | 42 | 42 | 64 | 64 | 64 | 88 | 88 | 88 | B0 | B0 | C0 | C0 | 00 |
| 3F- | 17 | AD | 23 | FF | 03 | 04 | ED | F4 | 47 | 3A | 00 | 00 | 00 | 00 | 00 | 00 |

TABLE X

| LOC | -0 | -1 | -2 | -3 | -4 | -5 | -6 | -7 | -8 | -9 | -A | -B | -C | -D | -E | -F |
|---|---|---|---|---|---|---|---|---|---|---|---|---|---|---|---|---|
| | | | | | ENVELOPE COMPUTER PROGRAM | | | | | | | | | | | |
| 00- | 23 | 01 | B9 | 02 | 91 | 27 | B8 | 03 | 90 | B8 | 0F | A0 | B8 | 11 | A0 | 00 |
| 01- | 00 | 00 | B9 | 0F | F1 | 19 | A1 | 44 | 82 | A1 | 36 | FE | B9 | 14 | BA | 04 |
| 02- | BB | 00 | F1 | 97 | C6 | 41 | 53 | EO | AC | F1 | 53 | 1F | 07 | 4C | A1 | 53 |
| 03- | 1F | 96 | 41 | FC | 47 | 77 | AD | 23 | 80 | E7 | ED | 39 | 53 | 1F | 6C | A1 |
| 04- | A7 | FB | F7 | AB | 19 | EA | 22 | B9 | 07 | 31 | B8 | 18 | BE | 01 | 14 | 80 |
| 05- | B8 | 20 | BE | 02 | 14 | 80 | B8 | 28 | BE | 04 | 14 | 80 | B8 | 30 | BE | 08 |
| 06- | 14 | 80 | B8 | B8 | BE | 10 | 14 | 80 | 04 | 12 | 64 | 46 | C6 | 79 | 07 | 1B |
| 07- | EA | 6C | 00 | 00 | A1 | BF | 50 | 04 | 4A | FB | 47 | 2F | B1 | 21 | 04 | 4A |
| 08- | B9 | 0F | F1 | 19 | D1 | 5E | 03 | FF | F6 | C3 | 19 | F1 | 5E | 03 | FF | F6 |

TABLE X-continued

| | | | | | ENVELOPE COMPUTER PROGRAM | | | | | | | | | | | |
|---|---|---|---|---|---|---|---|---|---|---|---|---|---|---|---|---|
| LOC | -0 | -1 | -2 | -3 | -4 | -5 | -6 | -7 | -8 | -9 | -A | -B | -C | -D | -E | -F |
| 09- | B4 | F8 | 03 | 07 | A8 | 27 | A0 | C8 | A0 | 44 | AE | B9 | 01 | 91 | F8 | 53 |
| 0A- | F8 | 03 | 06 | A8 | 56 | 6A | F0 | 3A | 18 | F0 | 39 | FE | 72 | B0 | 44 | B4 |
| 0B- | 23 | 03 | 04 | AE | 18 | F0 | B3 | B8 | 24 | 50 | BB | 24 | D7 | BE | 44 | 1F |
| 0C- | C1 | 44 | 48 | C9 | F1 | 5E | 03 | FF | F6 | CF | 18 | B0 | C0 | 04 | 99 | B9 |
| 0D- | 02 | 23 | 00 | 91 | FE | 03 | 20 | 19 | 26 | D8 | 91 | 23 | 02 | C9 | 91 | 36 |
| 0E- | DF | 81 | A0 | 27 | 91 | B9 | 11 | F1 | 4E | A1 | B9 | 03 | 91 | 23 | 01 | C9 |
| 0F- | 24 | 00 | 00 | 00 | 00 | 00 | 00 | 00 | 00 | 00 | 00 | 00 | 00 | 07 | 64 | 86 |
| 10- | 26 | 00 | 91 | 36 | 03 | F0 | 53 | 0F | 97 | 67 | AC | F0 | 47 | 53 | 0F | F7 |
| 11- | 03 | 00 | E3 | AB | FF | 53 | F0 | 47 | 03 | 07 | 37 | 6C | 37 | 18 | 18 | AA |
| 12- | 53 | 08 | 03 | F8 | F6 | 3E | B0 | 21 | F8 | 03 | 05 | A8 | F0 | C8 | C8 | A0 |
| 13- | 18 | F0 | C8 | C8 | A0 | 18 | 54 | C0 | C8 | C8 | 20 | 18 | 44 | 95 | FA | 03 |
| 14- | FA | BA | 07 | AC | 47 | E7 | AD | 23 | 80 | E7 | EC | 49 | 6D | A0 | 24 | 27 |
| 15- | FF | 53 | 08 | 03 | FF | E6 | 65 | 18 | 00 | F0 | 53 | E0 | AB | F0 | 53 | 1F |
| 16- | 07 | C6 | 67 | 6B | A0 | 04 | 99 | FB | 47 | 77 | AA | 23 | 80 | E7 | EA | 6D |
| 17- | 6B | A0 | 18 | 18 | F0 | 18 | 18 | 60 | A0 | C8 | F0 | 18 | 18 | 70 | E6 | 83 |
| 18- | 23 | FF | 00 | A0 | 37 | 00 | AB | BA | 07 | C8 | EA | 89 | F0 | 53 | 0F | 03 |
| 19- | 14 | E3 | 6B | E6 | 97 | 04 | 99 | F0 | 18 | B0 | BA | 23 | 18 | 00 | 00 | 18 |
| 1A- | 18 | A0 | 03 | 23 | E3 | AB | C8 | C8 | C8 | F0 | 53 | 0F | 97 | 00 | 37 | 03 |
| 1B- | 10 | BA | 05 | 18 | EA | B3 | A0 | AA | 54 | C0 | BA | 07 | C8 | EA | BC | 54 |
| 1C- | F1 | 18 | 18 | B0 | F6 | B9 | 13 | F1 | C6 | CC | 04 | 99 | C8 | C8 | C8 | B0 |
| 1D- | BD | 04 | 99 | 23 | 18 | 24 | 9F | FF | 53 | 04 | 03 | FF | F6 | E0 | 04 | 99 |
| 1E- | 18 | F0 | 07 | C6 | E8 | A0 | 04 | 99 | 54 | EF | 18 | F0 | 07 | A0 | C6 | FE |
| 1F- | 03 | 23 | E3 | AB | 18 | 18 | F0 | AA | 54 | C0 | C8 | C8 | 44 | 00 | 44 | 09 |
| 20- | C8 | 27 | 30 | 07 | C6 | 0D | 30 | 04 | 99 | 54 | E6 | 24 | F0 | F0 | 03 | F5 |
| 21- | A0 | B9 | 13 | 61 | E6 | 18 | 04 | 99 | C8 | C8 | C8 | B0 | BD | 04 | 99 | FF |
| 22- | 53 | 02 | 03 | FF | F6 | 28 | 04 | 99 | 18 | F0 | 07 | A0 | C6 | 30 | 04 | 99 |
| 23- | 54 | EF | 18 | F0 | 07 | A0 | C6 | 44 | 03 | 23 | E3 | AB | 18 | 18 | F0 | AA |
| 24- | 54 | C0 | 04 | 99 | 54 | E6 | 44 | 38 | FF | 53 | 01 | 03 | FF | F6 | 51 | 04 |
| 25- | 99 | 18 | F0 | 07 | A0 | C6 | 59 | 04 | 99 | 54 | EF | 18 | F0 | 07 | A0 | C6 |
| 26- | 6D | 03 | 23 | E3 | AB | 18 | 18 | F0 | AA | 54 | C0 | 04 | 99 | 54 | E6 | 44 |
| 27- | 61 | 00 | 00 | 00 | 00 | 00 | 00 | 00 | 00 | 00 | 00 | 00 | 00 | 00 | 00 | 00 |
| 28- | 00 | 00 | B8 | 11 | F0 | 03 | 80 | B8 | 03 | 90 | BA | 12 | EA | 8C | 53 | 7F |
| 29- | 90 | 81 | C9 | 04 | 19 | 18 | A0 | C8 | F0 | C8 | C8 | 20 | 18 | 18 | A0 | F8 |
| 2A- | 03 | FB | A8 | B0 | B7 | 04 | 99 | 00 | 00 | 00 | 00 | 00 | 00 | 00 | 8A | 04 |
| 2B- | 23 | 08 | 04 | 9B | 8A | 04 | 91 | 93 | 00 | 00 | 00 | 00 | 00 | 00 | 00 | 00 |
| 2C- | 18 | FA | C6 | D4 | 27 | 97 | 2B | 67 | 2B | 67 | EA | 65 | AC | A0 | 18 | FB |
| 2D- | A0 | C6 | D7 | 93 | 27 | 44 | CC | FC | C6 | DC | F0 | 93 | B9 | 11 | FE | 37 |
| 2E- | 51 | A1 | B9 | 03 | 91 | 93 | 18 | 18 | 10 | 23 | 18 | C8 | C8 | A0 | 93 | C8 |
| 2F- | C8 | F0 | 53 | F0 | 47 | 03 | 3C | E3 | 18 | 18 | A0 | 93 | 00 | 00 | 00 | 00 |
| 30- | 00 | 00 | 00 | 00 | 1B | 26 | 20 | 2D | 26 | 36 | 2D | 40 | 36 | 4C | 40 | 5B |
| 31- | 40 | 6C | 5B | 80 | 01 | 02 | 03 | 04 | 06 | 08 | 0B | 10 | 17 | 20 | 2D | 40 |
| 32- | 5A | 80 | B5 | FF | 84 | 88 | 8C | 90 | 94 | 98 | 9D | A1 | A6 | AB | B0 | B5 |
| 33- | BA | C0 | C5 | CB | D1 | D7 | DE | E4 | EB | F2 | F9 | FF | 0A | 09 | 09 | 07 |
| 34- | 06 | 05 | 04 | 03 | 02 | 02 | F8 | 03 | FA | A8 | F0 | 47 | 53 | 0F | 37 | 03 |
| 35- | 0C | 77 | AA | F8 | 03 | 07 | A8 | F0 | AC | C8 | F0 | AB | FA | F2 | 72 | FA |
| 36- | 53 | 0F | AA | EA | 69 | B8 | 03 | 04 | A6 | 97 | 2C | 67 | 2C | 2B | 67 | 2B |
| 37- | 64 | 63 | 97 | FC | 67 | AC | FB | 67 | AB | 97 | FC | 67 | AD | FB | 67 | 6B |
| 38- | AB | FD | 7C | AC | 64 | 5F | B8 | 02 | 23 | 03 | 90 | 36 | 8B | 81 | B2 | B1 |
| 39- | 23 | 01 | 90 | BA | 05 | B9 | 13 | 26 | 97 | 81 | A1 | 19 | 23 | 03 | 90 | 36 |
| 3A- | 9F | 23 | 01 | 90 | EA | 97 | B9 | 14 | F1 | 00 | 00 | BA | 06 | BB | 00 | 04 |
| 3B- | 6C | BA | 05 | BB | 00 | B8 | 1D | B9 | 10 | F1 | 67 | E6 | E2 | 28 | 03 | 08 |
| 3C- | 28 | EA | BA | B8 | 03 | 23 | 20 | 77 | EC | C7 | 90 | 23 | 01 | B8 | 02 | 90 |
| 3D- | 26 | D0 | B9 | 11 | F1 | B9 | 03 | 91 | 23 | 03 | 90 | 36 | DB | 23 | 01 | 90 |
| 3E- | 04 | 1C | AD | FB | 37 | 70 | 00 | E6 | ED | F0 | AB | FA | AC | FD | 64 | BD |
| 3F- | 00 | 00 | 00 | 00 | 00 | 00 | 00 | 00 | 00 | 00 | 00 | 00 | 00 | 00 | 00 | 00 |

TABLE XI

| | | | | | MODIFIED KEYBOARD COMPUTER PROGRAM | | | | | | | | | | | |
|---|---|---|---|---|---|---|---|---|---|---|---|---|---|---|---|---|
| LOC | -0 | -1 | -2 | -3 | -4 | -5 | -6 | -7 | -8 | -9 | -A | -B | -C | -D | -E | -F |
| 00- | 44 | E0 | 00 | C5 | 44 | F0 | 24 | B5 | B9 | 33 | 42 | 11 | 03 | F4 | F6 | 0B |
| 01- | 62 | B9 | 28 | BA | 01 | BB | 00 | BC | 01 | FA | 47 | 03 | 06 | 3A | 09 | 21 |
| 02- | D1 | 96 | 34 | 1A | FA | 53 | 03 | 03 | FD | 96 | 2C | 1A | 19 | F9 | 03 | CD |
| 03- | C6 | 06 | 04 | 15 | 12 | BC | 92 | 41 | 77 | 1B | 2C | E7 | 92 | 23 | 2C | 04 |
| 04- | 34 | B8 | 17 | A0 | F1 | 47 | 5C | C6 | 62 | 49 | 47 | 6A | D5 | AA | DB | C6 |
| 05- | 67 | FA | DC | C6 | 6B | FA | DD | C6 | 6F | FA | DE | C6 | 73 | FA | DF | C6 |
| 06- | 77 | C5 | B8 | 17 | F0 | 04 | 38 | 23 | 01 | 04 | 79 | 23 | 02 | 04 | 79 | 23 |
| 07- | 04 | 04 | 79 | 23 | 08 | 04 | 79 | 23 | 10 | C5 | AE | B8 | 26 | F0 | 4E | A0 |
| 08- | B8 | 33 | F0 | AD | B8 | 1F | FE | 18 | 67 | E6 | 87 | FD | 37 | 60 | 37 | 03 |
| 09- | FB | E6 | B4 | 03 | DD | F6 | B8 | 03 | 28 | BE | FE | 1E | F7 | E6 | 9B | E7 |
| 0A- | E7 | 53 | 03 | 17 | 2E | E7 | E7 | 07 | EE | A7 | A0 | B8 | 26 | F0 | B8 | 04 |
| 0B- | 90 | 04 | 62 | 00 | 23 | 0F | 04 | AA | 23 | 02 | 04 | AA | B8 | 17 | A0 | F1 |
| 0C- | 5C | 96 | E7 | F1 | 47 | 5C | C6 | CD | F1 | 4C | A1 | 04 | 62 | FB | 47 | 6A |
| 0D- | D5 | AA | DB | C6 | E9 | FA | DC | C6 | ED | FA | DD | C6 | F1 | FA | DE | C6 |
| 0E- | F5 | FA | DF | C6 | F9 | 04 | 61 | 24 | 13 | 23 | 01 | 04 | FB | 23 | 02 | 04 |
| 0F- | FB | 23 | 04 | 04 | FB | 23 | 08 | 04 | FB | 23 | 10 | C5 | 37 | AE | B8 | 25 |
| 10- | F0 | 5E | A0 | 18 | F0 | 5E | A0 | B8 | 04 | 90 | B8 | 00 | 80 | F2 | 11 | 24 |
| 11- | 0C | 04 | 62 | FB | 47 | 6A | D5 | AA | DB | C6 | 76 | FA | DC | C6 | 7A | FA |

TABLE XI-continued

| | MODIFIED KEYBOARD COMPUTER PROGRAM | | | | | | | | | | | | | | | |
|---|---|---|---|---|---|---|---|---|---|---|---|---|---|---|---|---|
| LOC | -0 | -1 | -2 | -3 | -4 | -5 | -6 | -7 | -8 | -9 | -A | -B | -C | -D | -E | -F |
| 12- | DD | C6 | 7E | FA | DE | C6 | 82 | FA | DF | C6 | 86 | B8 | 27 | F0 | AA | C8 |
| 13- | C8 | F0 | 4A | 37 | 12 | 76 | 32 | 7A | 52 | 7E | 72 | 82 | 92 | 86 | F0 | 37 |
| 14- | 5A | A9 | BA | 00 | B8 | 05 | 97 | 67 | F6 | A9 | E8 | 47 | FA | C6 | AC | 07 |
| 15- | C6 | 71 | 8A | 01 | 26 | 52 | B8 | 04 | 23 | 20 | 90 | 9A | FE | 36 | 5D | B8 |
| 16- | 00 | 80 | 8A | 01 | 26 | 64 | A9 | B8 | 26 | F0 | B8 | 04 | 90 | 9A | FE | 36 |
| 17- | 6F | F9 | 24 | 88 | 04 | 61 | 23 | 01 | 24 | 88 | 23 | 02 | 24 | 88 | 23 | 04 |
| 18- | 24 | 88 | 23 | 08 | 24 | 88 | 23 | 10 | C5 | AE | B8 | 25 | F0 | 4E | A0 | B8 |
| 19- | 33 | F0 | AD | B8 | 1F | FE | 18 | 67 | E6 | 96 | FD | A0 | 23 | FB | 68 | A8 |
| 1A- | FB | 47 | 6A | A0 | B8 | 17 | F0 | 04 | 36 | 1A | 24 | 47 | C5 | FC | 47 | 4C |
| 1B- | 37 | 51 | A1 | 04 | 62 | B8 | 38 | F0 | 03 | 80 | B9 | 08 | 91 | F0 | 03 | E8 |
| 1C- | E6 | C4 | 44 | 00 | 10 | 9A | 0F | 00 | 09 | 37 | 32 | CE | 44 | 5B | 74 | AD |
| 1D- | 81 | 47 | 53 | 0F | AD | 9A | F7 | B8 | 38 | F0 | 03 | FD | E6 | E0 | 44 | 95 |
| 1E- | FD | B9 | 02 | 91 | B9 | 38 | F1 | 03 | 20 | B9 | 08 | 91 | B8 | 16 | F0 | 37 |
| 1F- | 12 | F4 | 44 | C4 | B8 | 00 | 80 | B8 | 27 | A0 | 16 | FE | 04 | 11 | 04 | 08 |
| 20- | B0 | 00 | 9A | 0F | 09 | B8 | 3F | 30 | D0 | 53 | F0 | C6 | 1C | 09 | A0 | 47 |
| 21- | 53 | 0F | AA | 23 | E8 | 03 | 18 | EA | 15 | B8 | 37 | A0 | B6 | 51 | 95 | B9 |
| 22- | 04 | B8 | 3A | BA | 05 | 00 | 00 | 00 | 00 | 27 | 8A | 01 | 26 | 2A | 81 | 9A |
| 23- | FE | F0 | 37 | 53 | F0 | 36 | 35 | 91 | 8A | 01 | 18 | F0 | 00 | 00 | 00 | 00 |
| 24- | 00 | 00 | 00 | 00 | 00 | 26 | 45 | EA | 53 | B8 | 26 | F0 | 91 | 9A | FE | 36 |
| 25- | 4F | 24 | C5 | 9A | FE | 44 | 35 | 00 | 00 | 00 | 00 | B8 | 38 | F0 | 03 | E9 |
| 26- | E6 | 6D | 8A | 08 | 64 | F0 | 00 | 09 | 53 | F0 | AD | 44 | 86 | B9 | 38 | F1 |
| 27- | B9 | 08 | 91 | B8 | 02 | BE | 04 | 27 | AC | AD | 97 | A7 | FC | 67 | AC | 4D |
| 28- | 90 | 46 | 84 | AD | EE | 7C | 9A | 07 | 00 | 09 | 37 | 12 | 8F | 24 | D7 | 74 |
| 29- | AD | FD | 91 | 24 | D5 | 03 | F1 | F6 | AD | FD | 47 | E7 | E7 | 03 | 03 | E3 |
| 2A- | AD | B9 | 38 | F1 | 03 | F0 | E6 | AB | 2D | 37 | 2D | 24 | E0 | 03 | FB | E6 |
| 2B- | B7 | B8 | 10 | FD | 90 | 24 | EC | F0 | 03 | 28 | A9 | FD | D1 | C6 | C2 | FD |
| 2C- | A1 | 85 | 24 | EC | B8 | 38 | F0 | 03 | E9 | F6 | CD | 24 | C4 | 8A | 02 | 27 |
| 2D- | B8 | 32 | A0 | E8 | D2 | 55 | 86 | D6 | 36 | D6 | 05 | 85 | B8 | 38 | 44 | 00 |
| 2E- | 9A | F4 | 27 | B8 | 04 | 90 | B8 | 16 | B0 | 01 | B8 | 38 | A0 | 95 | 44 | 02 |
| 2F- | 8A | 01 | AF | D5 | F8 | B8 | 34 | A0 | F9 | 18 | A0 | FA | 18 | A0 | 64 | 40 |
| 30- | 01 | 04 | 0A | 0A | 11 | 14 | 1A | 14 | 21 | 24 | 2A | 1C | 31 | 34 | 3A | 24 |
| 31- | 00 | 06 | 4D | 28 | 10 | 16 | 5D | 33 | 20 | 26 | 6D | 39 | 30 | 36 | 7D | 41 |
| 32- | 22 | 09 | 4C | 49 | 12 | 19 | 5C | 51 | 22 | 29 | 6C | 60 | 32 | 39 | 7C | 78 |
| 33- | 05 | 08 | 4E | 90 | 15 | 18 | 5E | B4 | 25 | 28 | 6E | D4 | 35 | 38 | 7E | FF |
| 34- | B8 | 00 | 26 | 42 | 80 | B9 | 27 | 53 | 1F | AA | F1 | 4A | A1 | B9 | 1A | FA |
| 35- | 19 | 67 | E6 | 50 | F1 | E3 | 03 | 80 | BA | 08 | 90 | 77 | EA | 5A | 29 | 03 |
| 36- | E6 | A8 | 03 | 1F | 29 | 2A | 80 | B8 | 27 | F0 | B8 | 15 | B0 | FC | C8 | B0 |
| 37- | 01 | C8 | 67 | A0 | F6 | 7A | 18 | F0 | A8 | 80 | B8 | 15 | F0 | C6 | 86 | 10 |
| 38- | C8 | 10 | C8 | F0 | 64 | 72 | 2A | E7 | 53 | 70 | 03 | 20 | 61 | B8 | 04 | 90 |
| 39- | 9A | FE | 36 | 92 | 38 | 26 | F0 | B8 | 04 | 90 | 8A | 01 | 86 | 9C | 9A | FE |
| 3A- | B8 | 36 | F0 | AA | C8 | F0 | A9 | C8 | F0 | A8 | C5 | FF | 93 | B8 | 37 | F0 |
| 3B- | 18 | 60 | A9 | 80 | 0E | 93 | 00 | 00 | 00 | 00 | 00 | 00 | 00 | 00 | 00 | 00 |
| 3C- | 00 | 00 | 00 | 00 | 00 | 00 | 00 | 00 | 00 | 00 | 00 | 00 | 00 | 00 | 00 | 00 |
| 3D- | 00 | 00 | 00 | 00 | 00 | 00 | 00 | 00 | 00 | 00 | 00 | 00 | 00 | 00 | 00 | 00 |
| 3E- | 00 | 00 | 00 | 00 | 00 | 00 | 00 | 00 | 00 | 00 | 00 | 00 | 00 | 00 | 00 | 00 |
| 3F- | 17 | AD | 23 | FF | 03 | 04 | ED | F4 | 47 | 3A | 00 | 00 | 00 | 00 | 00 | 00 |

TABLE XII

| | MODIFIED ENVELOPE COMPUTER PROGRAM | | | | | | | | | | | | | | | |
|---|---|---|---|---|---|---|---|---|---|---|---|---|---|---|---|---|
| LOC | -0 | -1 | -2 | -3 | -4 | -5 | -6 | -7 | -8 | -9 | -A | -B | -C | -D | -E | -F |
| 00- | 23 | 01 | B9 | 02 | 91 | 27 | B8 | 03 | 90 | B8 | 0F | A0 | B8 | 11 | A0 | B9 |
| 01- | 0F | F1 | 19 | A1 | B8 | 11 | F0 | 03 | 80 | B8 | 03 | 90 | BA | 12 | EA | 1E |
| 02- | 53 | 7F | 90 | 81 | C9 | A1 | 26 | 2A | 64 | 4E | B9 | 14 | BA | 04 | BB | 00 |
| 03- | F1 | 97 | C6 | 4F | 53 | E0 | AC | F1 | 53 | 1F | 07 | 4C | A1 | 53 | 1F | 96 |
| 04- | 4F | FC | 47 | 77 | AD | 23 | 80 | E7 | ED | 47 | 53 | 1F | 6C | A1 | A7 | F3 |
| 05- | F7 | AB | 19 | EA | 30 | B9 | 07 | 31 | B8 | 18 | BE | 01 | 14 | 78 | B8 | 20 |
| 06- | BE | 02 | 14 | 78 | B8 | 28 | BE | 04 | 14 | 78 | B8 | 30 | BE | 08 | 14 | 78 |
| 07- | B8 | 38 | BE | 10 | 14 | 78 | 04 | 0F | B9 | 0F | F1 | 19 | D1 | 5E | 03 | FF |
| 08- | F6 | F5 | 19 | F1 | 5E | 03 | FF | E6 | 8B | 24 | 8E | F8 | 03 | 07 | A8 | 27 |
| 09- | A0 | C8 | A0 | 8A | 04 | 23 | 08 | B9 | 01 | 91 | F8 | 53 | F8 | 03 | 06 | A8 |
| 0A- | F8 | 03 | FA | A8 | F0 | 47 | 53 | 0F | 37 | 03 | 0C | 77 | AA | F8 | 03 | 07 |
| 0B- | A8 | F0 | B9 | 04 | 91 | B9 | 01 | AC | C8 | F0 | AB | FA | F2 | D1 | FA | 53 |
| 0C- | 0F | AA | EA | C8 | B8 | 03 | 04 | E5 | 97 | 2C | 67 | 2C | CB | 67 | 2B | 04 |
| 0D- | C2 | 97 | FC | 67 | AC | FB | 67 | AB | 97 | FC | 67 | AD | FB | 67 | 6B | AB |
| 0E- | FD | 7C | AC | 04 | BE | F0 | 3A | 18 | F0 | 39 | FE | 72 | F1 | 8A | 04 | 91 |
| 0F- | 93 | 23 | 03 | 04 | ED | C9 | F1 | 5E | 03 | FF | F6 | FE | 04 | 93 | B9 | 02 |
| 10- | 23 | 00 | 91 | FE | 03 | 20 | 19 | 26 | 07 | 91 | 23 | 02 | C9 | 91 | 36 | 0E |
| 11- | 81 | 56 | 17 | 53 | F0 | 03 | 0F | A0 | 27 | 91 | B9 | 11 | F1 | 4E | A1 | B9 |
| 12- | 03 | 91 | 23 | 01 | C9 | 26 | 25 | 91 | 36 | 28 | FF | E7 | 53 | 01 | AC | D0 |
| 13- | 53 | 01 | AB | F0 | 47 | E7 | 53 | 1E | 6B | E3 | AB | F0 | 63 | 0F | 6C | 97 |
| 14- | 67 | AC | FF | 53 | 70 | 47 | 03 | 08 | 37 | 6C | 37 | 18 | 18 | AA | 53 | 08 |
| 15- | 03 | FF | F6 | 7C | B0 | 21 | F8 | 03 | 05 | A8 | F0 | C8 | C8 | A0 | 18 | F0 |
| 16- | C8 | C8 | A0 | 18 | 54 | 99 | C8 | C8 | 20 | 18 | 18 | A0 | C8 | F0 | C8 | C8 |
| 17- | 20 | 18 | 18 | A0 | F8 | 03 | FB | A8 | B0 | 21 | 04 | 93 | FA | 03 | FA | BA |
| 18- | 07 | AC | 47 | E7 | AD | 23 | 80 | E7 | EC | 87 | 6D | A0 | 24 | 56 | C9 | F1 |
| 19- | 5E | 03 | FF | E6 | 97 | 44 | 1E | 18 | F0 | 03 | DF | C6 | A3 | 44 | 2A | 23 |
| 1A- | 18 | 24 | ED | FF | 53 | 08 | 03 | FF | E6 | B7 | 18 | F0 | 53 | E0 | AB | F0 |

TABLE XII-continued

| | | | | | | | | | | | | | | | | |
|---|---|---|---|---|---|---|---|---|---|---|---|---|---|---|---|---|
| | MODIFIED ENVELOPE COMPUTER PROGRAM | | | | | | | | | | | | | | | |
| LOC | -0 | -1 | -2 | -3 | -4 | -5 | -6 | -7 | -8 | -9 | -A | -B | -C | -D | -E | -F |
| 1B- | 53 | 1F | 07 | C6 | B9 | 6B | A0 | 04 | 93 | FB | 47 | 77 | AA | 23 | 80 | E7 |
| 1C- | EA | BF | 6B | A0 | 18 | 18 | F0 | 18 | 18 | 60 | A0 | C8 | F0 | 18 | 18 | 70 |
| 1D- | E6 | D4 | 23 | FF | A0 | 37 | AB | BA | 07 | C8 | EA | D9 | F0 | 53 | 0F | 03 |
| 1E- | 12 | E3 | 6B | F6 | B7 | F0 | 18 | B0 | 24 | 12 | 9F | 23 | 0C | 18 | 18 | A0 |
| 1F- | 03 | 23 | E3 | AB | C8 | C8 | C8 | F0 | 53 | 0F | 97 | 67 | 37 | 03 | 08 | BA |
| 20- | 05 | 18 | EA | 01 | A0 | AA | 54 | 99 | BA | 07 | C8 | EA | 0A | 54 | CB | 18 |
| 21- | 18 | B0 | F6 | B9 | 13 | F1 | 53 | F0 | 96 | 38 | C8 | C8 | 44 | FA | 18 | F0 |
| 22- | B3 | 22 | 24 | A3 | 25 | 44 | 3A | 28 | 44 | 70 | FF | 53 | 01 | 03 | FF | E6 |
| 23- | 38 | 18 | 64 | F0 | F1 | 47 | 54 | 86 | 04 | 93 | FF | 53 | 04 | 03 | FF | E6 |
| 24- | 38 | 18 | F0 | 07 | A0 | 96 | 38 | 54 | C8 | B9 | 13 | F1 | 53 | 0F | AD | 54 |
| 25- | 86 | C8 | C8 | C8 | 27 | 30 | C6 | 5E | 07 | ED | 56 | 30 | 04 | 93 | F0 | 03 |
| 26- | F6 | A0 | B9 | 13 | 53 | F0 | 61 | F6 | 5C | C8 | C8 | C8 | B0 | 27 | 04 | 93 |
| 27- | FF | 53 | 02 | 03 | FF | E6 | 6E | 18 | F0 | 07 | A0 | 96 | 84 | 54 | C9 | B9 |
| 28- | 0E | F1 | 54 | 86 | 04 | 93 | 53 | 0F | AA | 18 | F0 | 07 | C6 | BF | EA | 8B |
| 29- | A0 | 03 | 21 | E3 | AB | 18 | 18 | F0 | AA | 18 | FA | C6 | AD | 27 | 07 | 2B |
| 2A- | 67 | 2B | 67 | EA | 9E | AC | A0 | 18 | FB | A0 | C6 | B0 | 93 | 27 | 44 | A5 |
| 2B- | FC | C6 | B5 | F0 | 93 | B9 | 11 | FE | 37 | 51 | A1 | B9 | 03 | 91 | 93 | 18 |
| 2C- | 18 | 10 | 23 | 18 | C8 | C8 | A0 | 44 | 8E | C8 | C8 | F0 | 53 | F0 | 47 | 03 |
| 2D- | 3A | E3 | 18 | 18 | A0 | 93 | 31 | B9 | 0E | FA | A1 | 04 | 58 | 97 | 67 | DB |
| 2E- | 02 | F6 | E4 | 1D | 03 | 48 | E3 | C6 | ED | A1 | FD | 64 | 9B | FC | 32 | F4 |
| 2F- | 23 | C0 | 44 | E9 | FD | 12 | F2 | 27 | 44 | E9 | C8 | B0 | 27 | 04 | 93 | 00 |
| 30- | 00 | 00 | 00 | 00 | 26 | 36 | 2D | 40 | 36 | 4C | 40 | 5A | 4C | 6C | 5B | 80 |
| 31- | 6C | 98 | 80 | B6 | 03 | 04 | 06 | 08 | 0B | 10 | 17 | 20 | 2D | 40 | 5A | 80 |
| 32- | B5 | FF | 84 | 88 | 8C | 90 | 94 | 98 | 9D | A1 | A6 | AB | B0 | B5 | BA | C0 |
| 33- | C5 | CB | D1 | D7 | DE | E4 | EB | F2 | F9 | FF | 0A | 09 | 08 | 07 | 06 | 05 |
| 34- | 04 | 03 | 02 | 02 | 0C | 08 | 06 | 04 | 21 | 42 | 64 | 88 | B0 | 00 | B8 | 02 |
| 35- | 23 | 03 | 90 | 36 | 53 | 81 | B2 | B2 | 23 | 01 | 90 | BA | 05 | B9 | 13 | 26 |
| 36- | 5F | 81 | A1 | 19 | 23 | 03 | 90 | 36 | 67 | 23 | 01 | 90 | EA | 5F | B9 | 14 |
| 37- | F1 | 92 | AE | BA | 80 | 47 | 97 | 67 | 03 | FB | E6 | 84 | 03 | 48 | E3 | A1 |
| 38- | 23 | 50 | 64 | 89 | 03 | 05 | B1 | 21 | 47 | 6A | AF | BC | 03 | 19 | F1 | 47 |
| 39- | 03 | FC | E6 | 96 | 44 | DD | B1 | 21 | 03 | 48 | E3 | BD | 04 | 67 | 2A | 67 |
| 3A- | 2A | 2B | 67 | 2B | ED | 9D | EC | 8D | FB | 47 | B9 | 13 | 44 | D6 | BA | 00 |
| 3B- | 64 | 75 | BA | 05 | BB | 00 | B8 | 1D | B9 | 10 | F1 | 67 | E6 | E3 | 28 | 03 |
| 3C- | 08 | 28 | EA | BB | B8 | 03 | 23 | 20 | 77 | EC | C8 | 90 | 23 | 01 | B8 | 02 |
| 3D- | 90 | 26 | D1 | B9 | 11 | F1 | B9 | 03 | 91 | 23 | 03 | 90 | 36 | DC | 23 | 01 |
| 3E- | 90 | 04 | 2A | AD | FB | 37 | 70 | E6 | ED | F0 | AB | FA | AC | FD | 64 | BE |
| 3F- | F0 | 07 | A0 | 96 | FB | 54 | C9 | B9 | 0E | 44 | 34 | 04 | 93 | 00 | 00 | 00 |

The programs listed in Tables IX through XII each require less than 1024 words of ROM, hence each can be implemented in an Intel 8048 microcomputer. It should be apparent to those skilled in the art that a single microcomputer, such as Intel's 8049, can be programmed to perform the functions of both the keyboard and the envelope computer. The 8049 has a 2048 word ROM, a 128 word RAM, and will operate at an 11 mhz clock rate, which is practically twice the speed of the 8048.

Consequently a single 8049 could perform the combined programs at the same rate as the two 8048s do. Although one microcomputer would be eliminated with this approach, additional peripheral components, such as a port expander, would be needed to compensate for the reduced input/output of a single 8049 compared to the two 8048s.

Although the invention has been described and illustrated in detail, it is to be understood that the same is by way of illustration and example only and is not to be taken by way of limitation, the spirit and scope of the invention being limited only by the terms of the appended claims.

I claim:

1. A keyboard musical instrument including;

a first preset control for selecting an envelope attack rate, a second preset control for selecting a first envelope decay rate, a third preset control for selecting a second envelope decay rate, a fourth preset control for selecting an envelope breakpoint level, a fifth preset control for selecting a third envelope decay rate, and a digital envelope generator comprising;

a first programmatic means activated in response to operation of a playing key to generate an envelope having the selected attack rate, a second programmatic means activated by said first means upon termination of the attack phase to continue generation of the envelope at the selected first decay rate, a third programmatic means activated in response to the envelope reaching the selected breakpoint level to continue generation of the envelope at the selected second rate, and a fourth programmatic means activated in response to release of the playing key to complete generation of the envelope at the selected third decay rate.

2. A keyboard musical instrument as claimed in claim 1 in which said digital envelope generator includes;

a fifth programmatic means operative to scale the envelope generated by said first four means in accordance with the pitch of the selected note.

3. In an electronic musical instrument, a digital envelope generator comprising:

a first register holding a current envelope amplitude, a memory table storing a series of data values having a magnitude range of 2 to 1 between the data values stored at the first and last locations in said table and being exponentially related to the location of the data in the table, a second register holding the location of a data value (stored) in said table, a third register holding a characteristic value n, a programmed controller operative to decrement said second register at periodic intervals and to decrement said first register exponentially in accordance with (selected) data values read (stored) at corresponding locations in said memory table selected by said second register and then divided by $2^n$, said controller being further operative to recycle said second register when it reaches the location of the last data value in said memory table and simultaneously increment the characteristic value in said third register, whereby the envelope amplitude held in said first register is decremented exponentially at periodic intervals over a range of $2^n$ to 1.

4. An electronic musical instrument as claimed in claim 3 including:

preset controls for selecting envelope parameters, (and)

a first counter, and programmatic means for operating said counter (operated) cyclically through a range controlled by one of said preset controls to time the periodic (operation of said controller) decrements in the envelope amplitude.

5. An electronic musical instrument as claimed in claim 3 including;

preset controls for selecting envelope parameters, and programmatic means for varying the address increments between successive accesses to said memory table in accordance with the setting of said preset controls.

6. An electronic musical instrument as claimed in claim 4 including;

a keyboard for selecting the pitch of notes to be produced, a second counter, and programmatic means for operating said second counter (operated) cyclically through a range controlled by the pitch of a selected note and at a rate proportional to the cyclical rate of (the) said first counter to time the periodic (operation of said controller) decrements in the envelope amplitude.

7. An electronic musical instrument as claimed in claim 4 including;

a keyboard having sequentially operated contacts, a timer responsive to the elapsed time between contact closures to measure the key velocity when a note is selected, (and)

a second counter, and programmatic means for operating said second counter (operated) cyclically through a range controlled by said timer and at a rate proportional to the cyclical rate of the first counter to time the periodic (operation of said controller) decrements in the envelope amplitude.

8. In an electronic musical instrument having a keyboard for selecting the pitch of notes to be produced and having preset controls for selecting envelope parameters;

(a digital envelope generator including,)

a first counter, programmatic means for operating said first counter (operated) cyclically through a range controlled by one of said preset controls, a digital envelope generator including, a second counter, programmatic means for operating said second counter (operated) cyclically through a range controlled by the pitch of a note selected by said keyboard and at a rate proportional to the cyclical rate of said first counter, a register for holding (the) a current envelope amplitude, and an arithmetic unit operated to decrement said register in response to each cycle of said second counter.

9. An electronic musical instrument as claimed in claim 8 including;

a plurality of said digital envelope generators and programmatic means for assigning said envelope generators to selected notes as they are played.

10. In an electronic musical instrument having a keyboard with two sequentially operated contacts for each key, a timer responsive to the elapsed time between contact closures to measure the key velocity when a note is selected, and preset controls for selecting envelope parameters;

(a digital envelope generator including,)

a first counter, programmatic means for operating said first counter (operator) cyclically through a range controlled by one of said preset controls, a digital envelope generator including, a second counter, programmatic means for operating said second counter (operated) cyclically through a range controlled by said timer at a rate proportional to the cyclical rate of said first counter, a register for holding (the) a current envelope amplitude, and an arithmetic unit operated to decrement said register in response to each cycle of said second counter,

11. An electronic musical instrument as claimed in claim 10 including programmatic means for additionally varying the range of said second counter in accordance with the pitch of a note selected by said keyboard.

12. An electronic musical instrument as claimed in claim 10 including;

a plurality of said digital envelope generators, and programmatic means for assigning said envelope generators to selected notes as they are played.

13. An electronic musical instrument as claimed in claim 11 including;

a plurality of said digital envelope generators and programmatic means for assigning said envelope generators to selected notes as they are played.

* * * * *